US011095874B1

(12) United States Patent
Hitchcock et al.

(10) Patent No.: US 11,095,874 B1
(45) Date of Patent: *Aug. 17, 2021

(54) STEREOSCOPIC VIEWER

(71) Applicant: Centauri, LLC, Chantilly, VA (US)

(72) Inventors: Brad Hitchcock, Encinitas, CA (US); Vachara Tatar Nusso, San Clemente, CA (US); Robert Murray Pardridge, San Marcos, CA (US); Kenneth Austin Abeloe, Carlsbad, CA (US); Benjamin L. Ochoa, Carlsbad, CA (US)

(73) Assignee: Centauri, LLC, Chantilly, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/712,869

(22) Filed: Dec. 12, 2019

Related U.S. Application Data

(63) Continuation of application No. 15/995,678, filed on Jun. 1, 2018, now Pat. No. 10,516,878, which is a continuation of application No. 15/658,885, filed on Jul. 25, 2017, now Pat. No. 9,992,487.

(60) Provisional application No. 62/372,954, filed on Aug. 10, 2016.

(51) Int. Cl.
| | |
|---|---|
| *H04N 13/00* | (2018.01) |
| *H04N 9/80* | (2006.01) |
| *H04N 13/341* | (2018.01) |
| *H04N 13/117* | (2018.01) |
| *H04N 13/122* | (2018.01) |
| *H04N 13/398* | (2018.01) |
| *H04N 13/167* | (2018.01) |

(52) U.S. Cl.
CPC ......... *H04N 13/341* (2018.05); *H04N 13/117* (2018.05); *H04N 13/122* (2018.05); *H04N 13/167* (2018.05); *H04N 13/398* (2018.05)

(58) Field of Classification Search
CPC .. G11B 27/3027; G11B 27/329; H04N 5/765; H04N 5/85; H04N 9/8042; H04N 9/8205; H04N 13/0207; H04N 13/0217; H04N 13/0257; H04N 13/0022; G06T 15/205
See application file for complete search history.

(56) References Cited

U.S. PATENT DOCUMENTS

| | | | | |
|---|---|---|---|---|
| 2004/0252187 A1* | 12/2004 | Alden | ................. | H04N 13/302 348/51 |
| 2011/0129198 A1* | 6/2011 | Toma | ................... | H04N 9/8042 386/239 |
| 2012/0032882 A1* | 2/2012 | Schlachta | ............. | G06F 3/0346 345/157 |
| 2012/0293773 A1* | 11/2012 | Publicover | ............. | A61B 3/113 351/210 |
| 2013/0113993 A1* | 5/2013 | Dagit, III | ................ | G06F 3/017 348/552 |

(Continued)

*Primary Examiner* — Zaihan Jiang
(74) *Attorney, Agent, or Firm* — Knobbe, Martens, Olson & Bear LLP

(57) ABSTRACT

Features for a lightweight stereoscopic viewing client are described. The client can generate accurate ground point coordinates from selections within the lightweight viewer by accumulating the transformations from original image sources to the images used to render the stereoscopic scene to accurately predict error for a point selection. The viewer may also be decoupled from a permanent image store allowing on-demand retrieval of images via a network for stereoscopic viewing.

20 Claims, 11 Drawing Sheets

(56) References Cited

U.S. PATENT DOCUMENTS

| | | | |
|---|---|---|---|
| 2013/0181980 A1* | 7/2013 | Mizutani | H04N 13/302 345/419 |
| 2014/0152784 A1* | 6/2014 | McCoy | H04N 13/167 348/52 |
| 2014/0168207 A1* | 6/2014 | Pu | H04N 13/261 345/419 |
| 2015/0130716 A1* | 5/2015 | Sridharan | G06F 3/012 345/158 |
| 2015/0237335 A1* | 8/2015 | Gruszka | H04N 13/327 348/43 |
| 2015/0245011 A1* | 8/2015 | Shibazaki | G06T 15/205 348/46 |
| 2016/0036877 A1* | 2/2016 | Yeom | H04N 21/4667 709/219 |
| 2016/0182877 A1* | 6/2016 | Deluca | H04N 13/332 348/53 |

* cited by examiner

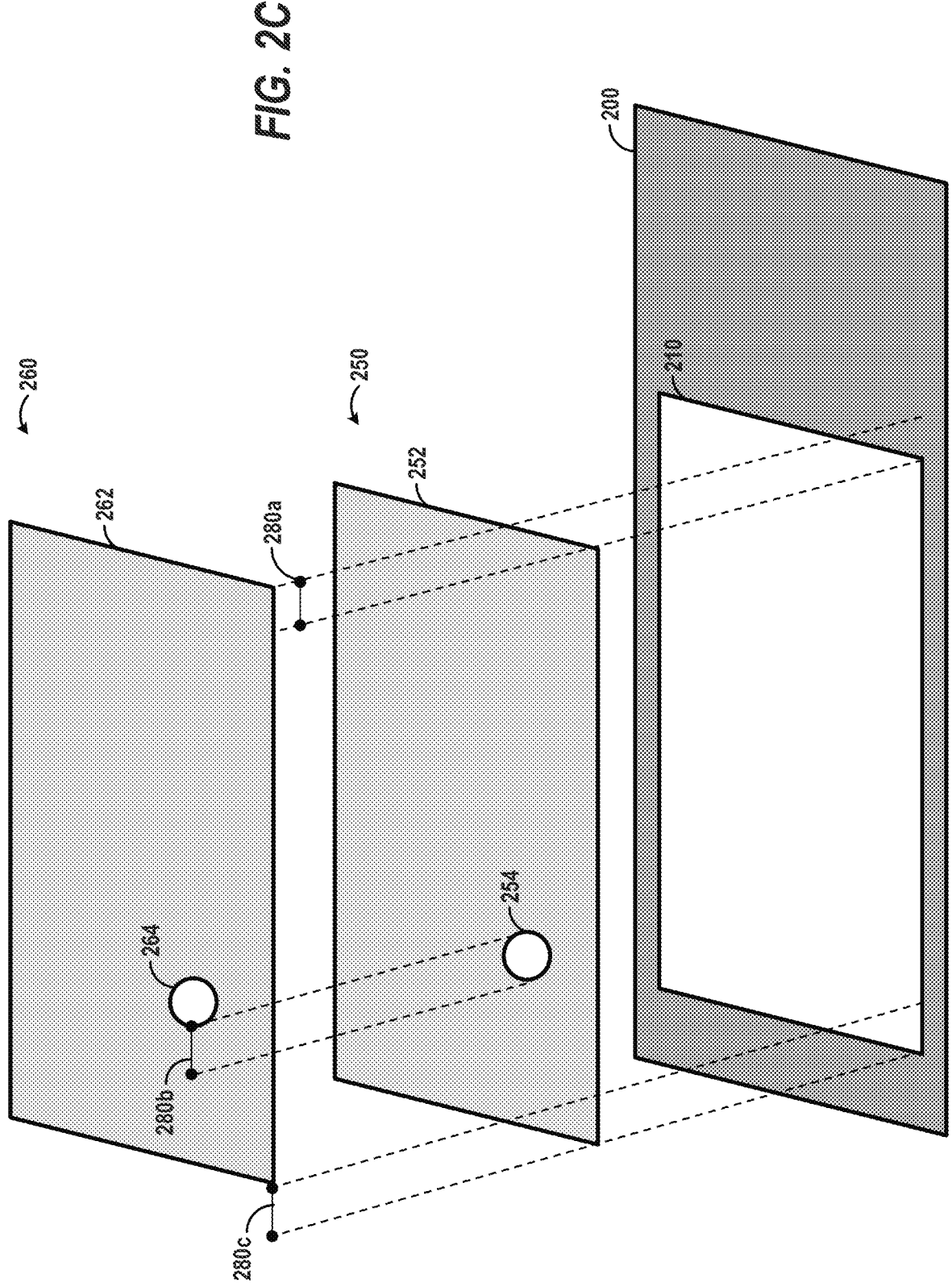

STEREOSCOPIC VIEWER

CROSS-REFERENCE TO RELATED APPLICATIONS

This application is a continuation of U.S. patent application Ser. No. 15/995,678, filed Jun. 1, 2018, now U.S. Pat. No. 10,516,878, which is a continuation of U.S. patent application Ser. No. 15/658,885, filed Jul. 25, 2017, now U.S. Pat. No. 9,992,487, which claims the benefit of Provisional Application No. 62/372,954, filed Aug. 10, 2016. The contents of the above-referenced applications are hereby expressly incorporated by reference in their entirety. Furthermore, any and all priority claims identified in the Application Data Sheet, or any correction thereto, are hereby incorporated by reference under 37 C.F.R. § 1.57.

BACKGROUND

Field

This disclosure relates to stereoscopic imaging and in particular to accurate presentation of and interaction with stereoscopic images in a network-based client.

Background

As technology advances, the types and quantities of data that can be presented increase. Networking advances untether a device presenting the data from any single location, allowing data to be presented almost anywhere a network can be accessed.

A picture can be worth a thousand words. Image data can convey information in a very fast and effective way. Recent advances have expanded the types of image data from two to three dimensions. Solutions to view three-dimensional data typically require sophisticated hardware and software to present realistic three-dimensional images. Furthermore, three dimensional images typically require a stereo image pair to present. Having the right images available for presentation can present resource challenges such as memory and/or bandwidth needed to obtain and store a library of images. Still further, depending on the application, how the images are used (e.g., targeting, analysis, visualization) can also require accurate calibration for interactions in three-dimensions between the scene and input devices such as selection tools.

Consider heritage architectures that use traditional thick-client applications. In such systems, true stereoscopic viewing is implemented using an OpenGL interface that allows stereo display buffer manipulation resident on the graphics card—giving an application access to the stereo synch used by stereo graphics hardware. In newer architectures using browser web apps, an OpenGL capability subset is available through the WebGL JavaScript API. Although WebGL exposes many of the OpenGL rendering routines, it does not provide the explicit methods needed to construct a true stereographic view. Due to these limitations with the WebGL implementation in current browsers, network-based applications cannot access the stereographic interfaces needed to display true stereo and provide the desired accuracy for interactions with stereoscopic imagery presented via such interfaces.

SUMMARY

The systems, methods and devices of the disclosure each have several innovative aspects, no single one of which is solely responsible for the desirable attributes disclosed herein.

In one innovative aspect, a client application plugin for rendering a stereoscopic scene is provided. The client application plugin includes a client application interface. The interface may receive messages to initialize the client application plugin for rendering a stereoscopic scene; identify a display area for presenting a stereoscopic scene; and identify an interaction within the display area. The interaction may be associated with: a first coordinate within the display area of the interaction with a first view of the stereoscopic scene, and a second coordinate within the display area of the interaction with a second view of the stereoscopic scene. The client application plugin includes a stereoscopic viewing device driver configured to transmit instructions to configure a stereoscopic viewing device to alternatively activate a left eye and a right eye. The client application plugin includes a display device driver configured to transmit instructions to present one or more views of the stereoscopic scene. The client application plugin includes a scene manager configured to: identify a set of images to include in the stereoscopic scene; generate the first view of the stereoscopic scene, the first view including at least one image from the set of images; generate the second view of the stereoscopic scene, the second view including at least one other image from the set of images, and synchronize, via the display device driver, alternating presentation of the first view and the second view with the alternative activation of the left eye and the right eye of the stereoscopic viewing device based at least in part on a user specified parallax. The second view is offset from the first view to form a stereoscopic image pair with the first view. The client application interface is further configured to generate a set of coordinates a location identified by the interaction. The set of coordinates includes: a viewport coordinate identifying the location using coordinates within the first view and the second view; a rectified coordinate identifying the location within rectified versions of the at least one image and the at least one other image using the viewpoint coordinate; an original image coordinate identifying the location within the at least one image and the at least one other image using the rectified coordinate; and a spatial coordinate identifying the location as a geospatial location using the original image coordinate.

In some implementations of the client application plugin, the client application interface may be configured to generate a first viewport coordinate for the first view based at least in part on the first coordinate the user specified parallax. The plugin may also generate a second viewport coordinate for the second view based at least in part on the second coordinate the user specified parallax. In such instances, the viewpoint coordinate included in the set of coordinates may include one of the first viewport coordinate or the second viewport coordinate.

In some implementations of the client application plugin, the client application interface may be configured to generate a first rectified image coordinate based at least in part on a first viewport coordinate included in the set of coordinates, and at least one of: (i) a first scaling factor or (ii) a first translation applied to the at least one image shown in the first view. The plugin may also generate a second rectified image coordinate based at least in part on a second viewport coordinate included in the set of coordinates, and at least one of: (i) a second scaling factor or (ii) a second translation applied to the at least one other image shown in the second view. In such instances, the rectified coordinate included in the set of coordinates may include one of the first rectified image coordinate or the second rectified image coordinate.

In some implementations, the client application interface may be configured to generate a first original image coordinate based at least in part on a first rectified image coordinate included in the set of coordinates and a first rectification applied to the at least one image shown in the first view. The client application interface may be configured to generate a second original image coordinate based at least in part on a second rectified image coordinate included in the set of coordinates and a second rectification applied to the at least one other image shown in the second view. In such implementations, the original image coordinate included in the set of coordinates comprises one of the first original image coordinate or the second original image coordinate.

In some implementations of the client application plugin, the client application interface may be configured to generate the spatial coordinate based at least in part on triangulation of a first original image coordinate and a second original image coordinate. The spatial coordinate may identify a three dimensional location. The client application interface may be configured to generate an image point error estimate for the viewport coordinate by accumulating the errors from x-parallax, y-parallax in stereo space, from translation (x, y) and scale in rectified image space, and from the rectification process in original image space. The error estimate may be propagated by the interface when generating the spatial coordinate. The client application interface may transmit the error estimate to the scene manager. The scene manager may be configured to present a perceivable indicator of the error estimate. The perceivable indicator may include a color of a cursor displayed within the display area.

In some implementations of the client application plugin, the scene manager may be configured to determine that the interaction within the display area indicates a second set of images to include in the stereoscopic scene. The scene manager may generate a third view of the stereoscopic scene, the third view including at least one image from the second set of images and generate a fourth view of the stereoscopic scene, the fourth view including at least one other image from the second set of images. The fourth view may be offset from the third view to form a stereoscopic image pair with the third view. The scene manager may synchronize, via the display device driver, alternating presentation of the third view and the fourth view with the alternative activation of the left eye and the right eye of the stereoscopic viewing device.

The scene manager may be configured to determine that the interaction within the display area indicates a zooming or panning of the stereoscopic scene. The scene manager may further generate a third view of the stereoscopic scene, the third view including at least one additional image from the set of images and generate a fourth view of the stereoscopic scene, the fourth view including at least one other additional image from the set of images, wherein the fourth view is offset from the third view to form a stereoscopic image pair with the third view. The scene manager may synchronize, via the display device driver, alternating presentation of the third view and the fourth view with the alternative activation of the left eye and the right eye of the stereoscopic viewing device.

In some implementations, the scene manager may be configured to receive a message indicating a geographic area of interest, and identify the set of images using the geographic area of interest. The scene manager may identify the set of images by transmitting a query, via a network, to an image data server and receiving image data in response to the query.

In another innovative aspect, a stereoscopic imaging system is provided. The system includes a computer-readable memory storing executable instructions. The system includes one or more computer processors in communication with the computer-readable memory. The one or more computer processors are configured to execute the executable instructions to at least generate a stereoscopic scene including a left-eye view and a right-eye view for a specified location. The instructions are executed to identify a display area within a web-browser for presenting alternating views included in the stereoscopic scene based at least in part on a user defined parallax and generate left viewport coordinate identifying a location of the cursor using coordinates of the cursor in the left-eye view and the user defined parallax. The instructions are further executed to generate right viewport coordinate identifying the location of the cursor using coordinates of the cursor in the right-eye view and the user defined parallax and to generate left-view rectified coordinate identifying the location of the cursor within at least a portion of a first rectified image shown in the left-eye view using the left viewport coordinate. The instructions are executed to generate right-view rectified coordinate identifying the location of the cursor within at least a portion of a second rectified image shown in the right-eye view using the right viewpoint coordinate and to generate original left image coordinate identifying the location of the cursor within the at least one image using the left-view rectified coordinate, the at least one image being a non-rectified version of the first rectified image. The instructions are also executed to generate original right image coordinate identifying the location of the cursor within the at least one other image using the right-view rectified coordinate, the at least one other image being a non-rectified version of the second rectified image and to generate a spatial coordinate identifying a geospatial location (e.g., two-dimensional or three-dimensional) identified by the location of the cursor using the original left image coordinate and the original right image coordinate.

In some implementations of the stereoscopic imaging system, the one or more computer processors may be configured to execute the executable instructions to at least generate the left-view rectified coordinate using the left viewport coordinates and at least one of: (i) a first scaling factor or (ii) a first translation applied to the first rectified image.

In some implementations of the stereoscopic imaging system, the one or more computer processors may be configured to execute the executable instructions to at least generate the original left view coordinate using the left-view rectified coordinate and a first rectification applied to the non-rectified version of the first rectified image.

In some implementations of the stereoscopic imaging system, the one or more computer processors may be configured to execute the executable instructions to at least generate the generate the spatial coordinate based at least in part on triangulation of the original left image coordinate and the original right image coordinate.

An innovative apparatus for rendering a stereoscopic scene is also provided. The apparatus includes means for receiving a display area allocation from a client application. The apparatus includes means for synchronizing display of the stereoscopic scene between a display device and a stereoscopic viewing device. The apparatus also includes means for alternating display of a left view of the stereoscopic scene and a right view of the stereoscopic scene in the display area via the client application on the display device. The apparatus further includes means for alternating activation of a left eye and a right eye of the stereoscopic viewing device. The left eye is activated when the left view of the stereoscopic scene is displayed on the display device and the right eye is activated when the right view of the stereoscopic scene is displayed on the display device. The apparatus also includes means for generating a spatial coordinate for a location identified by an interaction with the stereoscopic scene based at least in part on: a user specified parallax used to display the stereoscopic scene, translations applied to images shown in the stereoscopic scene, and triangulation between a first coordinate for the location generated from the left view and a second coordinate for the location generated from the right view.

An innovative method of rendering a stereoscopic scene is also described. The method includes receiving a display area allocation from a client application. The method includes synchronizing display of the stereoscopic scene between a display device and a stereoscopic viewing device. The method also includes alternating display of a left view of the stereoscopic scene and a right view of the stereoscopic scene in the display area via the client application on the display device. The method further includes alternating activation of a left eye and a right eye of the stereoscopic viewing device. The left eye is activated when the left view of the stereoscopic scene is displayed on the display device and the right eye is activated when the right view of the stereoscopic scene is displayed on the display device. The method also includes generating a spatial coordinate for a location identified by an interaction with the stereoscopic scene based at least in part on: a user specified parallax used to display the stereoscopic scene, translations applied to images shown in the stereoscopic scene, and triangulation between a first coordinate for the location generated from the left view and a second coordinate for the location generated from the right view.

BRIEF DESCRIPTION OF THE DRAWINGS

The accompanying drawings, together with the specification, illustrate exemplary embodiments, and, together with the description, serve to explain the principles of this disclosure. Without limiting the scope of this invention as expressed by the claims which follow, some features are discussed briefly below. After considering this discussion, and particularly after reading the section entitled "Detailed Description," it will be understood how advantageous features of this application include, among other things, a portable, thin-client, three-dimensional image viewer.

FIG. 2C is a layer diagram of the example interface generated by a stereo viewer web-browser plugin shown in FIG. 2A.

DETAILED DESCRIPTION

Figure 1:
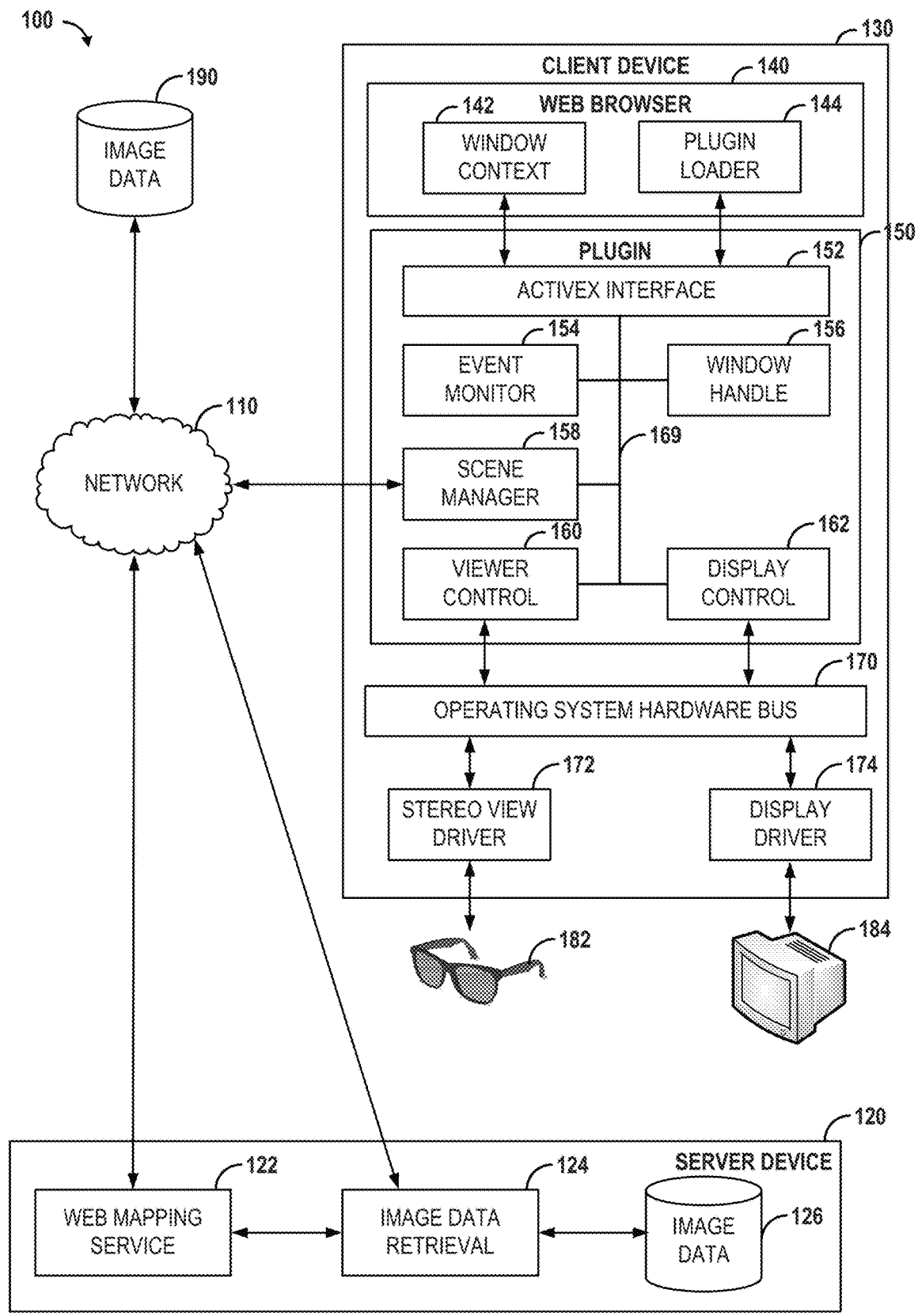
FIG. 1 shows functional block diagram of an example of a stereoscopic display system including a stereo viewer plugin.

Stereoscopic systems can play a critical role in many planning scenarios. For example, when identifying a specific location for providing aid such as via an air drop, a stereoscopic system may be used to identify the specific location. The process allows a workstation remote from the specific location to display images of the specific location for viewing by a user, and by selecting a portion of the image, to generate a ground coordinate for the selected portion.

To support such systems, sophisticated specially built/configured workstations may be provided that can display stereoscopic images and determine ground points. The workstations in existing system include expensive and substantial graphics processing elements and image storage capabilities. To obtain new images, which may be of better resolution or more accurately depict the area, physical media is typically accessed to load the new images onto the workstation. This can be time and resource consuming particularly when new images may be available on daily, hourly, or sooner.

Such workstations may also include specifically compiled applications to present the imagery, receive selections, and transmit results. Any updates to the applications must be compiled and physically installed on each workstation. This too can be a time consuming and resource intensive effort.

Some mapping solutions allow the selection of a point on a two-dimensional map. However, such solutions typically provide only a location. This location is generally specified and is not associated with any error. In critical planning scenarios such as planning delivery of aid, error may be as important if not more important than the ground coordinate. Error can often mean the difference between delivering life-saving medicine to remotely located individuals and dumping these materials into a river or other inaccessible location.

The features described in this application provide non-limiting solutions to the problem of accurately presenting three-dimensional images without dedicated hardware or software. Features are described for presenting three-dimensional images within an existing application such as a web-browser. Features are also described to allow managing user interactions with three-dimensional data displayed through an existing application such as a web-browser. Because the user interactions may be indicate points of interest, change the scene (e.g., pan and/or zoom), change the viewing area (e.g., expand or shrink the application window) or other visual adjustments, features for accurately tracking and presentation of a three-dimensional scene in an existing application such as a web-browser are also provided.

Presenting an image may include displaying or causing display of the image. In the case of three-dimensional images, presenting may include displaying or causing display of multiple two-dimensional images that provide a three-dimensional view when observed. For example, anaglyph three dimensional views may be presented using two images with specific color filters that, when perceived, fuse into a single three-dimensional view. As another example, stereoscopic pairs of two-dimensional images may be displayed which each provide a slightly different perspective of the scene. When displayed in an alternating fashion, the perceived image takes on three-dimensions. Presenting an image may include transmitting an image or information identifying the image (e.g., a file locator) to a display device such as a computer, laptop, tablet computer, smartphone, virtual reality system, augmented reality system, smartglasses, or other electronic image display device. Presenting may include generating different versions of the image data based at least in part on the target display device, bandwidth used to transmit the image, display area allocated for presenting the image, or the like.

A portable, thin-client three-dimensional image viewer may be referred to as a stereo viewer. A portable client generally describes a software component than can be installed and executed by different systems. One example of a portable client is a "plug-in." A plug-in generally refers to software that can execute within the context of an application, such as a web-browser, and access one or more features of the application or the system executing the web-browser. The plug-in may access memory, graphics hardware, input devices (e.g., mouse, touchscreen, light pen, keyboard), and the like.

The stereo viewer plug-in described in further detail below provides the capability to view stereo image pairs in a web-browser with stereoscopic glasses, for example, NVIDIA 3D VISION™, commercially available from NVIDIA Corporation of Santa Clara, Calif. The stereo view plug-in presents (for example, on a display) ground features in the scene with high relief such as buildings, hills, or valleys with the illusion of depth within the web-browser. A map viewer has an interface allowing the user to pan and zoom to different areas of interest. The interface may be built using a library of JavaScript™ functions such as Leaflet, an open-source library for building applications including interactive maps. The stereo viewer plug-in includes instructions to dynamically retrieve image data over an area of interest at the appropriate resolution level and to fit the web-browser display area allocated for presenting the three-dimensional scene, from a WMS (Web Map Service) which may operate in a cloud infrastructure.

Some existing toolsets provide the capability to view imagery with stereoscopic glasses. But the implementations described in this application offer significant advantages. One non-limiting advantage is that since data is pulled dynamically from the cloud, the user is not required to have large collections of imagery already installed locally. A second non-limiting advantage is that the plugin is designed to run within existing client software such as a web-browser. This allows easy integration of stereo image viewing with other client software and other web-based applications where the client software may be dynamically updated for every user experience.

A third non-limiting advantage is providing a pipeline to ensure that interactions with images shown via the viewer can be accurately translated to one or more specific points (e.g., geolocations). For example, to present a scene, original source images are typically manipulated to provide a left and right view for stereoscopic viewing. Manipulations may include rotating an image, scaling an image, selecting a portion of an image, or the like. Each manipulation has an associated error. This error can be important if the images are being used for identifying locations such as for precision mapping, traffic routes, precision coordinate generation, flight planning, route planning, security assessment, etc. Described herein are features that allow the client to track and provide errors in an efficient manner. This allows the client to provide this error estimate to an external service such as a mensuration service, flight planning service, or other geospatial service.

Providing the error through the lightweight interface enables planning for a wide range of activities. For example, drone technology is becoming more pervasive. In some areas, flight plans must be registered or approved before a drone may operate. One barrier to flying is generating accurate flight plans with the requisite error considerations. The features described can provide such planning through, for example, a web browser. In such instances, a local authority may provide the viewer to pilots to plan flights and submit the same for review. Unlike legacy systems which required significant resources and administration to achieve the requisite level of accuracy and error detection, the features described can provide the same, if not more functionality, in a substantially more efficient fashion.

FIG. 1 shows functional block diagram of an example of a stereoscopic display system including a stereo viewer plugin. The system 100 may include a client device 130 that is configured to communicate with a server device 120 via a network 110. The network 110 may include one or more of a cellular network, a data network, a local area network, a wide area network, a mesh network, the Internet, public switched telephone network, private network, satellite network, and/or other network suitable for communicating data. The client device 130 may be implemented as a stereoscopic viewing workstation. The workstation may include a tablet computer, a laptop computer, a personal computer, or other networked device configured for presenting stereoscopic image. The client device 130 may be coupled with external hardware devices such as three-dimensional glasses 182 and a display 184. Other external hardware devices that may be coupled with the client device 130 include a keyboard, a mouse, a touch screen, a camera, a light pen, a scribble tablet, a microphone, virtual reality goggles, or other devices configured to provide inputs or present outputs as part of presenting and working with stereoscopic images.

The client device 130 may be coupled with external hardware through drivers that translate commands from generated by the client device 130 or applications executed by the client device 130 into commands that can be executed by the corresponding hardware. As shown in FIG. 1, a stereo view driver 172 is included in the client device 130. The stereo view driver 172 translates commands sent to and received from the three-dimensional glasses 182. The client device 130 also includes a display driver 174. The display driver 174 manages communications between the client device and the display 184. In some implementations, the drivers (e.g., the display driver 174 and/or the stereo view driver 172) may be provided by the manufacturer of the external hardware and installed on the client device 130.

An operating system hardware bus 170 is shown in FIG. 1. The operating system hardware bus 170 is a data transport structure provided to allow the client device 130 or applications executing on the client device 130 to communicate with the respective external hardware devices. In many instances, the operating system hardware bus 170 is an abstract layer that hides the specific details of operating a specific implementation of an external hardware device from the application accessing the external hardware device. In this way, physical implementations can be changed without necessarily having to change the application accessing the external hardware. For example, one client device may be configured to use NVIDIA 3D Vision goggles. In such implementations, the stereo view driver would be an NVIDIA driver configured to communicate with NVIDIA 3D Vision goggles. Another client device may be configured to use AMD HD3D™ goggles. In such implementations, the stereo view driver may be an AMD driver configured to communicate with AMD HD3D goggles. This allows the application to "plug-and-play" a variety of external hardware devices with little, if any, changes to the application and instead relying on the drivers to handle the translation.

Transmitting the messages may include formatting input values into a machine readable format and sending the message via a transport means. The transport means may include any data communication means such as radio, digital network packet, fiber optic packet, or the like. Receiving the messages may include decoding data from the personalized nutrition server, identifying one or more values included in the decoded data, and providing the values for further processing consistent with the features described herein. A transmission may be communicated via wired, wireless, or hybrid wired/wireless communication channels.

On example of an application that may communicate with external hardware devices is a web-browser 140. Examples of the web-browser 140 include MOZILLA FIREFOX®, MICROSOFT INTERNET EXPLORER®, MICROSOFT EDGE®, GOOGLE CHROME®, APPLE SAFARI®, OPERA SOFTWARE OPERA®, and the like. For purposes of this description, the example application executing on the client device 130 is the web-browser 140. It will be understood that other applications are implemented to allow plugins. Examples of other applications which support a plugin architecture include word processing applications (e.g. MICROSOFT WORD®; OPENOFFICE®), image processing/manipulation applications (e.g., GNU IMAGE MANIPULATION PROGRAM™ ADOBE PHOTOSHOP®), exploitation systems (e.g., TEXTRON REMOTEVIEW®, TEXTRON ELT® Series, BAE SYSTEMS Socet GXP®), geographic information systems (e.g., APPLE IMAPS®, GOOGLE MAPS® ESRI ARCGIS® family of systems), and visualization systems (e.g., PALANTIR Gotham, ISS WebTAS, Open Source Cesium, Analytical Graphics, Inc. Systems Tool Kit(STK)).

The web-browser 140 may receive an instruction including information identifying a plug-in to load. One example may be activating a control element included in the web-browser 140 such as a button. Once the button is activated, the web-browser 140 may attempt to execute the identified plugin. In some instances, the information may include a download location from which the plugin may be acquired.

In some implementations, the web-browser 140 may receive the instruction via content presented by the web-browser 140. For example, the web-browser 140 may be directed to load a specific web-page. Within the web-page, a plugin may be identified. As the web-browser 140 renders the specific web-page, the web-browser 140 may acquire and load the plugin according to the information included in the specific web-page. LISTING 1 below shows a JavaScript snippet including instructions to load a plugin by reference to a value included in a registry of applications stored by the client device 140.

The snippet shown in LISTING 1 embeds the plugin in a web-page using a particular HTML tag, using a unique identifier for the plugin. When the web-browser 140 reads the tag, a plugin loader 144 may look up the identifier in the registry to find the plugin's file location and load it. LISTING 1 shows a pseudo-code JavaScript function ("start") which creates the HTML display element that will contain the plugin (and associated output). In LISTING 1, the variable "CLSID" specifies the unique identifier for the plugin.

| LISTING 1 |
|---|
| ```
function start( )
{
    ...
    // Control ID (corresponds to ID in windows registry)
    CLSID = '567ECF44-AB69-4DA0-B428-62F73AE4CB93';
    var    isFirefox = typeof InstallTrigger !== 'undefined';
    var    isIE = /*@cc_on!@*/false || !!document.documentMode;
    var    innerHTML = " ";
    if (isIE) {
        innerHTML =
            '<OBJECT ' +
                'ID=\"stereoViewer\" ' +
                'WIDTH=' + windowWidth + ' HEIGHT=' + windowHei
                'CLASSID=\"CLSID:' + CLSID + '\">' +
                '<PARAM NAME=\"_Version\" VALUE=\"65536\">' +
                '<PARAM NAME=\"_ExtentX\" VALUE=\"2646\">' +
                '<PARAM NAME=\"_ExtentY\" VALUE=\"1323\">' +
                '<PARAM NAME=\"_StockProps\" VALUE=\"0\">' +
            '</OBJECT>';
    } else {
        innerHTML =
            '<object ' +
                'id=\"stereoViewer\" TYPE=\"application/x-itst-
                'ALIGN=\"baseline\" BORDER=\"0\" WIDTH=' +
            windowWidth + ' HEIGHT=' + windowHeight + ' ' +
                'clsid=\"{' + CLSID + '}\" ' +
                'event_ImagePointChanged=\"onImagePointUpdate\"
                '>'
            '</object>';
    }
    document.getElementById("map").innerHTML = innerHTML;
    ...
}
``` |

As shown in FIG. 1, the plugin loader 144 may load a stereo viewer plugin 150. The plugin 150 may be implemented using an application framework such as MICROSOFT ACTIVEX™. The framework allows plugins (sometimes referred to as "ActiveX Controls" or just "controls") to interoperate with the application it is plugging into. The plugin operates using a well-defined interface to send and receive messages with the web-browser. As shown in FIG. 1, an ActiveX interface 152 is included as the well-defined interface. Additional interfaces and/or frameworks that might be used include ActiveX scripting, ActiveX Template Library (ATL), Google Native Client, Adobe Flex, Microsoft Silverlight, and Netscape Plugin Application Programming Interface (NPAPI).

The operating system of the client device 140 may create contexts for each application executing. A context generally defines the scope of inputs and output available to the associated application. For example, a context for the web-browser 140 may include capturing inputs and outputs occurring within the boundary of window in which the web-browser 140 is executing. The context may also include resources available to the web-browser 140 such as memory and hardware resources.

The stereo viewer plugin 150 is implemented to display stereoscopic images. As such, the plugin 150 will need to display the images, preferably within the context of the web-browser 140. To facilitate the display, as shown in FIG. 1, a window context 142 may be provided to the plugin 150 via the ActiveX interface 152. The window context 142 identifies an area within which the plugin 150 can present information, control elements (e.g., icons, cursors), etc.

Figure 2A:
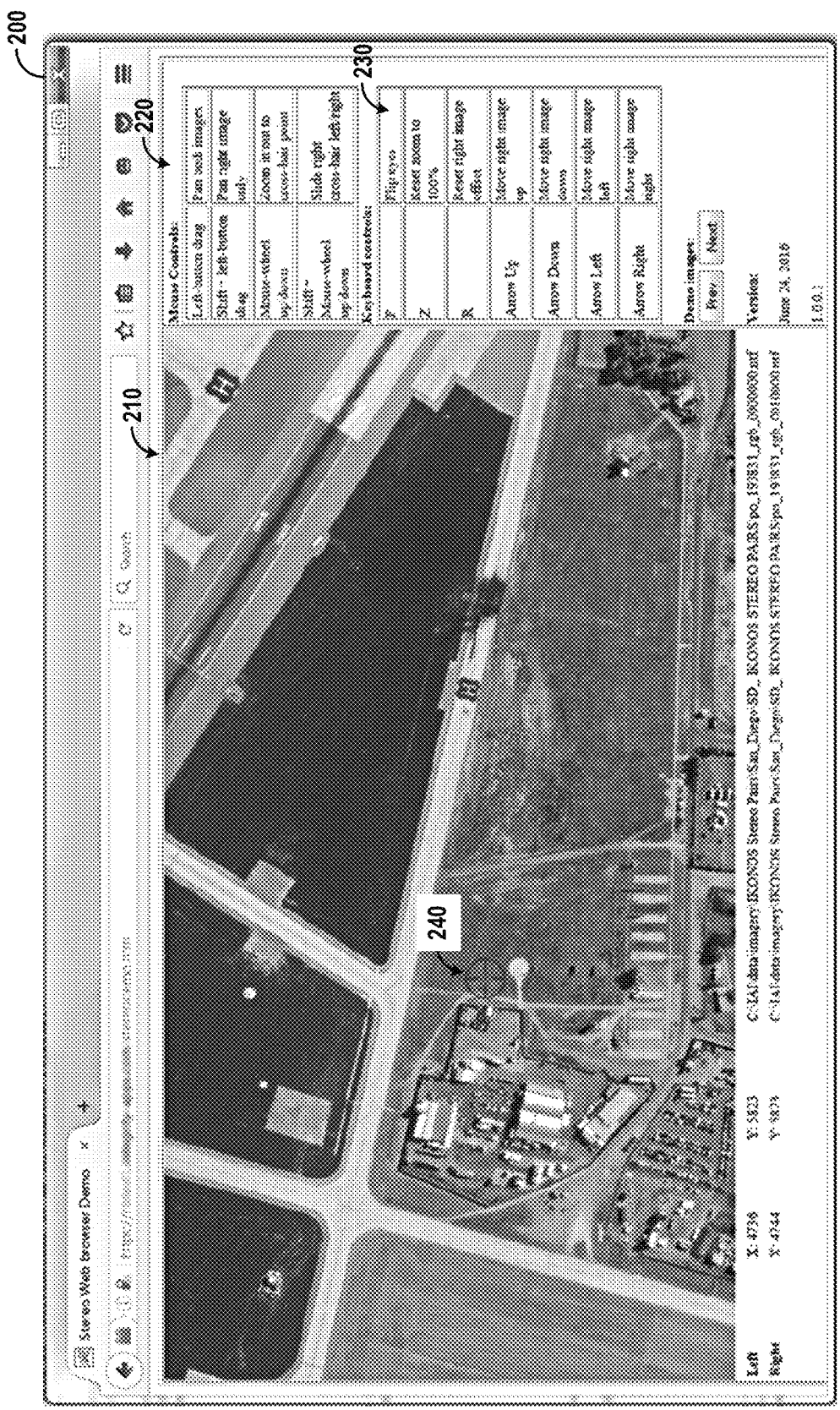
FIG. 2A is an example interface generated by a stereo viewer web-browser plugin.

FIG. 2A is an example interface generated by a stereo viewer web-browser plugin. A web-browser window 200 may be allocated for the web-browser 140. The web-browser window 200 may render web content such as the HTML page shown in FIG. 2A. Within the page, a stereoscopic display area 210 may be allocated to the plugin 150 for presenting stereoscopic images. Within the stereoscopic display area 210, a cursor 240 may be rendered. If the cursor is moved out of the stereoscopic display area 210, the cursor 240 may change graphical form (e.g., from target to pointer). Within the web-browser window 200, as the location of the cursor 240 identified within the area 210 allocated to the plugin 150, priority may be given to the plugin 150 to define how the cursor 240 is rendered. In some implementations, the plugin 150 may not define cursor adjustments. In such implementations, the priority may then pass to the web-browser 140 to determine how to render the cursor 240. Assuming there are no other plugins, if the web-browser 140 has no cursor adjustments defined, priority may pass to the operating system to provide a default presentation of the cursor 240. Similar priority passing may be used to respond to inputs such as mouse controls 220 and keyboard controls 230. If the web-browser window 200 is the active window on the client device 130, the plugin 150 may be given a first chance to respond to the input, then the web-browser 140, and ultimately the operating system.

Returning to FIG. 1, an event monitor 154 may be included in the plugin 150 to identify those events which are of interest to the plugin 150. Such events may include the mouse control 220 or the keyboard controls 230 shown in FIG. 2A. The event monitor 154 may register a listener for events generated through from window context 142. The registration may include identifying events of interest and a handler for the identified event. How the plugin may respond to different events is described in further detail with reference to FIG. 4.

From the window context 142, the plugin 150 shown in FIG. 1 may obtain a window handle 156. The window handle 156 affords the plugin 150 access to the stereoscopic presentation area 210. A scene manager 158 is included in the plugin 150. The scene manager 158 may be responsible for providing the information to the web-browser 140 for rendering graphics in the stereoscopic presentation area 210.

One aspect of rendering graphics that may be managed by the scene manager 158 is acquiring stereoscopic image data for presentation. Image data may include two or more images, a math model identifying the stereo relationship between the images and/or images and the ground (e.g., surface), a sensor model identifying characteristics of the sensor used to capture the images, annotation such as points or areas of interest shown in the images, and/or metadata such as time of capture, geolocation (e.g., latitude and longitude) of the area shown by the image, authorship, distribution rules, and the like. Image data may include one or more of the elements described in a collections standard document such as Department of Defense Interface Standard—NATIONAL IMAGERY TRANSMISSION FORMAT VERSION 2.1, MIL-STD-2500C (Mar. 1, 2006). The image data may be obtained from the server device 120 via the network 110. Obtaining the image data may include identifying an area of interest and transmitting a query message to a web mapping service 122 hosted by the server device 120. The web mapping service 122 may implement the OpenGIS® Web Map Service Interface Standard or similar well-defined standards based mapping service.

The web mapping service 122 may access an image data retrieval 124 configured to acquire image date from a local image data store 126 or a remote image data store 190 via the network 110. The local data store 126 may be co-located with the server device 120 while the remote image data store 190 may be located at a different network location than the server device 120. As such, the server device 120 may provide real-time image data as stored in the image data stores from many disparate locations.

Acquiring the image may include transmitting one or more messages including criteria to identify the image data that will satisfy the request from the client device 130. In some implementations, the message may be in a structured, machine readable format such as in a structured query language.

The scene manager 158 may use threads to acquire image data. For example, the scene manager 158 may spawn a thread for each requested location. This can facilitate faster acquisition of the image data particularly when multiple images may be used for the scene. In some implementations, this may be referred to as tiling.

Figure 2B:
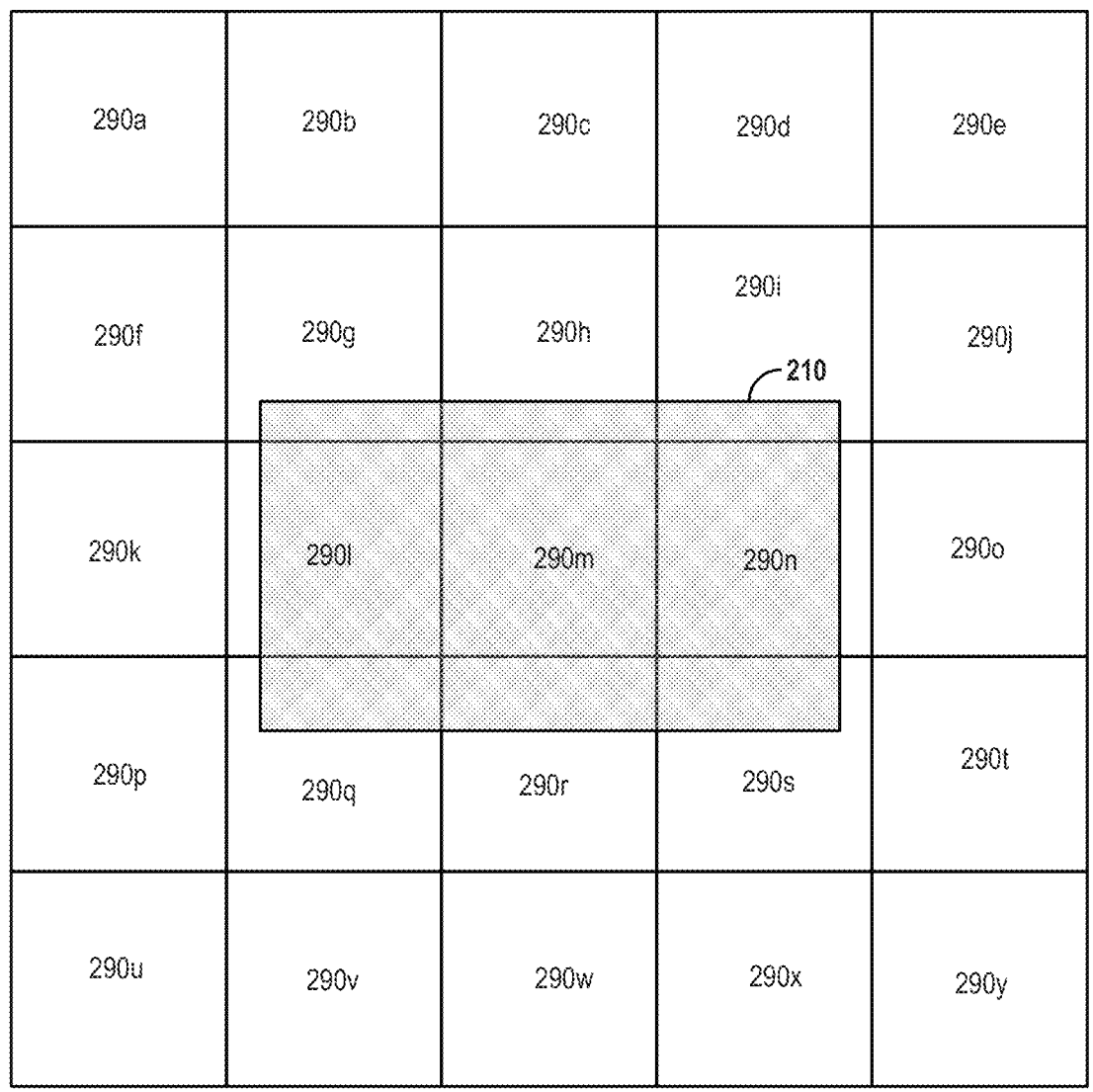
FIG. 2B is an example of tiling that may be used in the interface generated by a stereo viewer web-browser plugin shown in FIG. 2A.

FIG. 2B is an example of tiling that may be used in the interface generated by a stereo viewer web-browser plugin shown in FIG. 2A. In FIG. 2B, the stereoscopic view area 210 is shown. To fill the area 210 with images, it may be necessary to acquire multiple image tiles. As shown in FIG. 2B, image data from image tiles 209g, 290h, 290i, 290l, 290m, 290n, 290q, 290r, and 290s are needed. In some implementations, it may be efficient to also request tiles adjacent to the tiles used to fill the area 210 in anticipation of needing these tiles which include image data near the region of interest shown in the area 210. Accordingly, the scene manager 158 may perform the calculations necessary to identify not only the tiles needed for the area 210, but also the tiles anticipated to show regions adjacent to the regions displayed in the area 210. As shown in FIG. 2B, these additional tiles include 290a-290e, 290f, 290j, 290k, 290o, 290p, 290t, and 290u-290y. The adjacent tiles may be stored in a cache until needed or until a cache timeout occurs. The cache timeout may be based on an amount of time a tile is stored in cache. In such instances, the time a tile is stored in the cache is recorded and compared to the cache timeout. If the amount of from the storage time exceeds the cache timeout, the tile may be removed. The cache may also be cleared if the scene is changed (e.g., a different area of interest is requested) or the plugin or the web-browser is closed.

Returning to FIG. 1, to ensure proper stereoscopic presentation of the images, the scene manager 158 may coordinate the function of the glasses 182 and the display 184. The coordination with the glasses 182 may be coordinated by issuing commands through a viewer controller 160 included in the plugin 150. One way to show images in stereoscopic view, is to alternate left and right views of the scene. If the rate of switching is high enough, the scene will not appear to the human eye as a flickering image, but rather as an image with depth (e.g., three dimensional). The rate of switching must be coordinated with the rate at which the eyes of the glasses 182 are activated.

The scene manager 158 may provide instructions via the view control 160 to switch which eye should be activated. The scene manager 158 may also provide instructions via the display control 162 to indicate which view of the scene should be rendered on the display 184.

LISTING 2 provides pseudo-code for how the scene manager 158 may initiate and establish synchronization between the display and the glasses.

---
LISTING 2
---

```
// This initialization function will create our StereoScene
// class which will be used for rendering
bool CStereoViewCtrl::init( )
{
    ...
    // CStereoViewCtrl (our ActiveX control implementation class)
    // inherits from COleControl, which allows us to call GetSafeHwnd( )
    // to get a window handle necessary to initialize a Direct3D9 device
    _scene = new StereoScene;
    bool res = _scene->init(this->GetSafeHwnd( ));
    ...
}
// Here we will initialize the Direct3D9 device from
// the window handle parameter, and then the NvAPI stereo
// handle from the Direct3D9 device
bool StereoScene::init(HWND hWnd, int maxLayers)
{
    ...
    // Initialize NvAPI
    NvAPI_Initialize( );
    NvAPI_Stereo_SetDriverMode(NVAPI_STEREO_DRIVER_MODE_DIRECT);
    NvAPI_Stereo_Enable( );
    NvU8 isStereoEnabled;
    NvAPI_Status status = NvAPI_Stereo_IsEnabled(&isStereoEnabled);
    LPDIRECT3D9 dxObject = Direct3DCreate9(D3D_SDK_VERSION);
    if (dxObject == NULL) {
        return false;
    }
    D3DPRESENT_PARAMETERS presParams;
    ZeroMemory( &presParams, sizeof(presParams) );
    presParams.Windowed = TRUE;
    presParams.SwapEffect = D3DSWAPEFFECT_DISCARD;
    presParams.BackBufferFormat = D3DFMT_UNKNOWN;
    // Create the Direct3D9 Device from the window handle
    if (FAILED(dxObject->CreateDevice(
        D3DADAPTER_DEFAULT,
        D3DDEVTYPE_HAL,
        hWnd,
        D3DCREATE_HARDWARE_VERTEXPROCESSING,
        &presParams,
        &_device)))
    {
        _device = NULL;
        return false;
    }
    // Create the Stereo handle from the Direct3D9 Device
    if (status == NVAPI_OK && isStereoEnabled) {
        status = NvAPI_Stereo_CreateHandleFromIUnknown(_device, &_stereoHandle);
        if (status == NVAPI_OK) {
            _stereoEnabled = true;
        }
    }
}
```

LISTING 3 provides pseudo-code for a function that renders alternative views of a scene and adjusts the stereo viewing glasses to correspond with the altering views.

---
LISTING 3
---

```
// In this function we will draw the scene twice, once for each eye
// We will use a special call to NvAPI to set the active eye, using
// the stereo handle we created during initialization
bool StereoScene::draw( )
{
    ...
    // Set the active eye to left
    NvAPI_Stereo_SetActiveEye(_stereoHandle, NVAPI_STEREO_EYE_LEFT);
    // Draw scene items with left eye on
```

---
LISTING 3
---

```
    drawItems(true);
    // Set the active eye to right
    NvAPI_Stereo_SetActiveEye(_stereoHandle, NVAPI_STEREO_EYE_RIGHT);
    // Draw scene items with right eye
    drawItems(false);
    _device->Present(NULL, NULL, NULL, NULL);
    ...
}
```

FIG. 2C is an example of tiling that may be used in the interface generated by a stereo viewer web-browser plugin shown in FIG. 2A. FIG. 2C shows the browser window 200 and the stereoscopic view area 210. The browser window 200 may allocate the area 210 for the plugin 150 to present the stereoscopic images. The scene manager of the plugin 150 may identify the region of interest such as based on received criteria indicating a region. The criteria may include one or more of keywords, coordinates, selections from a drop down, or the like. Using the region of interest, the scene manager 158 may obtain the image data to render the scene. FIG. 2C shows how two views may be rendered by the scene manager to provide a stereoscopic scene. A first view 250 may include a first image 252 and a first cursor 254. A second view 260 may include a second image 262 and a second cursor 264. The first image and the second image may be a stereoscopic pair of images taken at an offset 280c. The stereoscopic pair may be obtained by two cameras having an offset or one camera at two different locations and times. For ease of explanation, FIG. 2C includes only one image per view. However, the tiling shown in FIG. 2B may be applied to display multiple images as part of a view.

The offset 280c between the images is maintained by the scene manager such that the offset 280b between the cursor positions, and the offset 280a within the area 210 are the same. The scene manager 158 thus maintains the proper geometric presentation of the elements to present a realistic, stereoscopic scene. As the scene manager 158 alternates between the first view 250 and the second view 260, the content displayed within the view maintains the offset 280a, 280b, and 280c.

The scene manager 158 may be further configured to adjust the offset based on zoom level. For example, a stereoscopic image pair may provide a realistic view for certain zoom levels. If the display is zoomed in beyond the maximum zoom level, it may be necessary to obtain a different stereo pair to provide the desired presentation at the specified zoom level. The zoom level may be an additional criteria specified by the scene manager 158 when obtaining image data.

For a given image, the scene manager 158 may adjust the offset between the first view and the second view to account for zoom level.

The client device 130 may include one or more processing units (not shown) which are configured to obtain instructions and data via the hardware bus 170 from a memory 176. The processing units may be implemented as a programmable logic device that performs instruction, logic, and mathematical processing, and may be representative of one or more CPUs. The memory 176 may include one or a combination of memory devices, including Random Access Memory, nonvolatile, backup memory (for example, programmable or flash memories, read-only memories, etc.), networked memory (for example, cloud storage). The memory 176 may include instructions executable by one or more processing units to cause the client device 130 to perform one or more of the functions described. While multiple discrete elements are shown in FIG. 1, it will be appreciated that, in some implementations, the elements may be commonly implemented such as a combination of the scene manager 158 and the event monitor 154.

Figure 3:
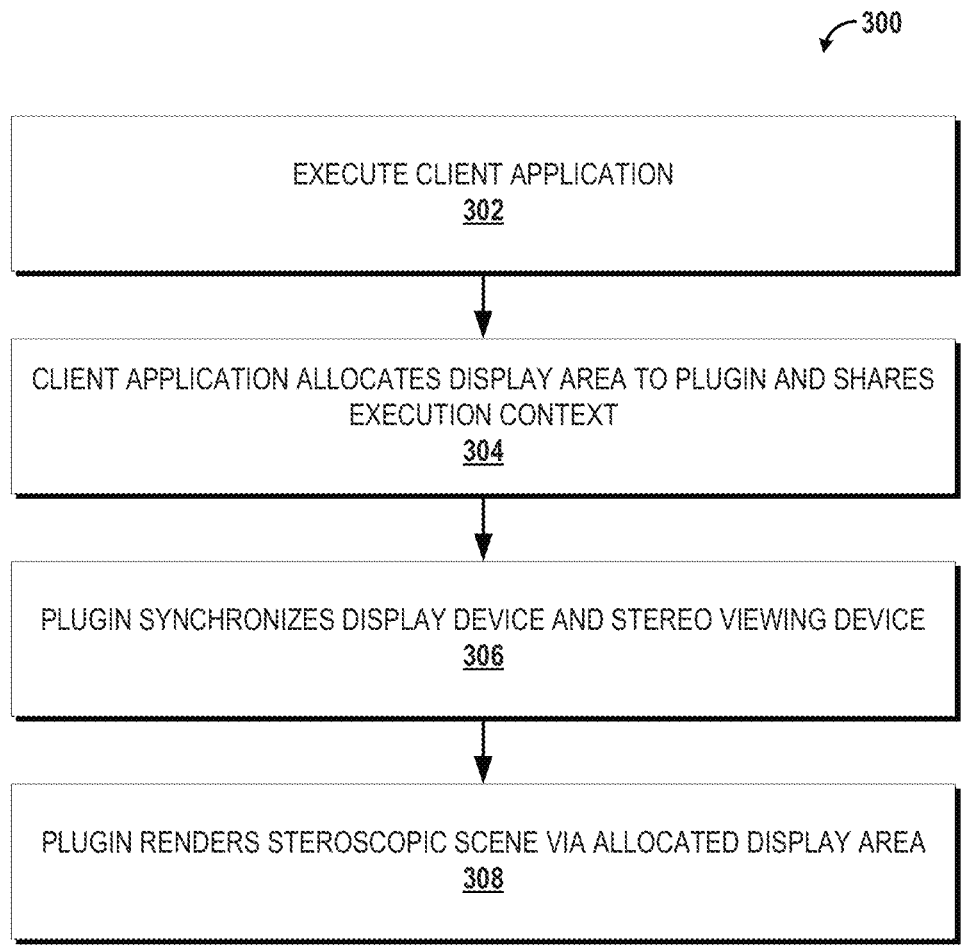
FIG. 3 is a process flow diagram of an exemplary method of coordinating hardware for displaying stereoscopic images.

FIG. 3 is a process flow diagram of an exemplary method of coordinating hardware for displaying stereoscopic images. The method 300 can be performed by one or more of the devices described in this application such as the client device 130 shown in FIG. 1.

At block 302, the client application may be executed. Execution of the client application may include receiving an identifier for the client application such via an input device coupled with the client device. The identifier may be provided when an icon associated with the client application is activated (e.g., clicked or otherwise selected) via a user interface. The execution may cause the client device to load and execute instructions for the client application from a memory location. Examples of a client application include a web-browser, word processing applications image processing/manipulation applications, and the like.

At block 304, the client application may allocate a display area to a plugin and share the execution context with the plugin. The allocation of the display area may be based on instructions included in content accessed by the client application. In the example of a web-browser, a web-page accessed by the web-browser may include instructions indicating a display area for the plugin. The plugin loader may identify and execute the instructions for the plugin. As part of the initialization of the plugin, context information may be provided to the plugin.

At block 306, the plugin may synchronize a display device and a stereo viewing device. The synchronization may include configuring a frame rate for each of the stereo viewing device and the display device. In some implementations, 120 hertz is a desirable display rate that balances the human perception of the view switching and machine resource utilization to manage the switching. The synchronization may include identifying configuration values for the display device and the stereo viewing device and confirming compatibility between two values. One example of such a configuration value is frame rate. Another example may be a value indicating stereoscopic capabilities. Synchronization may also include ensuring the timing between the view switching and the adjusting of the stereo viewing device is coordinated. For example, it may be desirable to ensure that the right view is presented on the display device when the right eye is active. In some implementations, the synchronization may include adjusting the light field or lens colors of the stereo viewing device with the view presented on the display device. The timing may be coordinated through thread blocking such that only one view can be active at a given moment. In such implementations, a thread may be associated with one of the views and, when activated, causes the presentation of the associated view along with activation of the respective eye of the stereo viewing device. In some implementations, the timing may be coordinated through the use of a flag. The flag may control conditional logic for presenting one of the two views whereby a given view is presented if the flag is set to a first value and the alternate view is presented if the flag is set to another value.

At block 308, the plugin may render the stereoscopic scene via the allocated display area. To render the scene, the plugin may utilize the window handle obtained from the window context of the client application. The window context may define the physical display area allocated to the plugin. Using this information, scene manager can obtain sufficient tiles to fill the allocated display area. For example, the window context may indicate that a display area 800 pixels wide and 400 pixels high is available for presenting the stereoscopic scene. If the images received by the scene manager are 100 pixel tiles, the scene manager can combine at least 32 tiles to present the scene. Rendering may also include alternating the left and right views as discussed above.

Rendering may include responding to events. The events may be input events such as cursor movement, key presses, or mouse events. The events may be adjustments to the client device and/or client application. For example, the user may expand the window in which the client application is executing. In such instances, the display area allocated to the plugin may increase. When the plugin detects such a change, the scene manager may respond to the event by, for example, increasing the number of tiles presented. The adjustments may also cause re-generation of error estimates for the images shown. As described further below, the images rendered on the interface may be portions or larger images that have been scaled or transformed from other images. Each transformation may introduce some error between the location of a pixel and a corresponding geospatial location. The client device may track the events to maintain a state for the stereoscopic scene. The state information may be used for example, to generate ground point from a selection within the client application and without expensive server communications.

Figure 4:
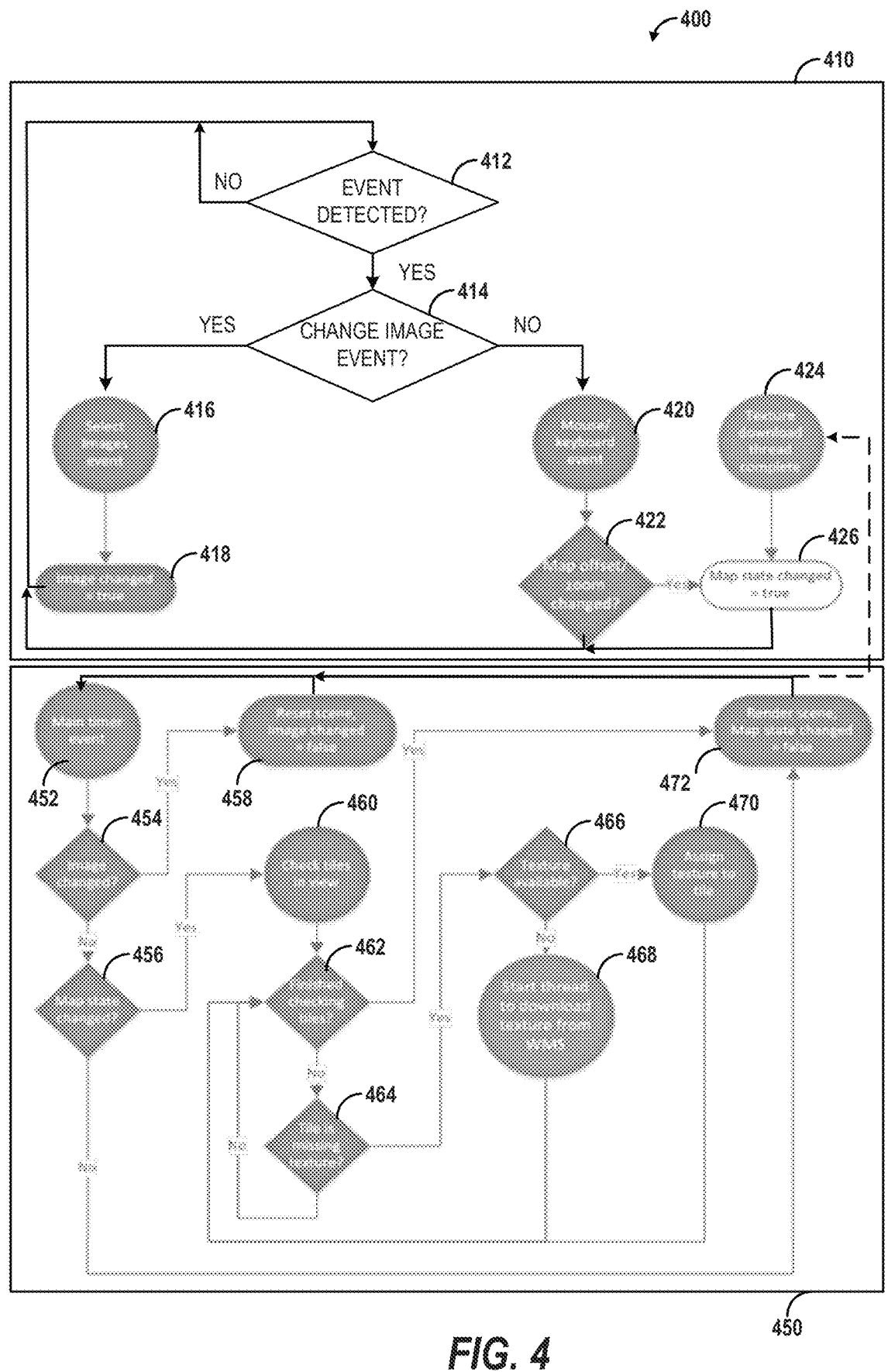
FIG. 4 is a process flow diagram of an exemplary method of rendering stereoscopic images with a stereo viewer plugin.

FIG. 4 is a process flow diagram of an exemplary method of rendering stereoscopic images with a stereo viewer plugin. The method 400 can be performed by one or more of the devices described in this application such as the client device 130 shown in FIG. 1.

The method 400 may be a multithreaded method having two processes executing simultaneously and communicating between each other. As shown in FIG. 4, a first thread 410 may include the features related to event management. A second thread 450 may include the features related to rendering the scene.

Turning to the first thread 410, the method 400 begins at block 412 by determining whether an event is detected. The determination may include registering an event listener and receiving a message indicating the source of the event, a type of event, and parameters associated with the event such as a location of the event (e.g., click location), speed of the event (e.g., click speed), and the like. If no event is detected, the first thread 410 returns to decision block 412 to monitor for future events. If the determination at block 412 is affirmative, at block 414 a determination is made as to whether the event is a change image event. A change image event is an event indicating that the stereoscopic image currently shown in the scene rendered by the plugin should be changed. The change image event may include receiving a new region of interest, receiving a new stereoscopic image pair, or other information identifying a change in the scene.

If the detected event is determined, at block 414, to be a change image event, at block 416, the event is handled by select new images event handler. Handling the event may include logging the event information (e.g., type, source, time, location, etc.), verifying the event (e.g., was the event initiated by an authorized user), and processing the event to cause the image rendered in the scene to change. At block 418, a state value is set to indicate a change in images is pending. The state value may be shared between the first thread 410 and the second thread 450 such as by storing the state value in a commonly accessible memory location. The second thread 450 can monitor the state value and take appropriate action as described in further detail below or generate a ground point coordinate by accurately accounting for any error that may be caused by state changes (e.g., zoom, scale, translation, rectification, etc.). The first thread 410 may then return to block 412 to detect future events.

Returning to decision block 414 of FIG. 4, if the event is not a change image event, the event will be handled by an input device event handler at block 420. As shown in FIG. 4, the input device may be a mouse or keyboard event. Other input device events may be handled at block 420 such as stylus inputs, touchscreen inputs, camera inputs, voice recognition inputs, accelerometer inputs, gyroscopic inputs, and the like. Handling the event at block 420 may include logging the event information (e.g., type, source, time, location, etc.), verifying the event (e.g., was the event initiated by an authorized user), and processing the event to cause a change in the views presented in scene. At decision block 422, a determination is made as to whether the input device event changed the map offset or zoom. The determination at block 422 may be based on a table that maps event types to their effect. If the detected event is not associated with a zoom or offset effect, the determination at block 422 event may have no consequence on the scene. Such events require no response by the method 400 and the first thread 410 may return to decision block 412 to detect future events. If, at block 422, the determination is made that the event is associated with a zoom or offset effect, at block 426, a map state value is set to indicate a change in the views is pending. The map state value may be shared between the first thread 410 and the second thread 450 such as by storing the map state value in a commonly accessible memory location. The second thread 450 can monitor the map state value and take appropriate action as described in further detail below. The first thread 410 may then return to block 412 to detect future events.

When a texture is completely downloaded from the second thread 450 as described below, then the value of the map state value may be set to true and subsequent event processing in 410 continues. FIG. 4 includes a dashed path from block 472 to indicate one point in the method 400 where this interaction may occur. It will be understood that the interaction may not be through direct messaging between the first thread 410 and the second thread 420 but rather through the shared variable space or by generating an event that can be detected by the first thread 410.

Turning now to the second thread 450, the second thread 450 illustrates the aspects of the method 400 for rendering the scene. At block 452, a main timer may be initiated. The main timer can be used by the plugin to synchronize the stereo viewer and the display to properly render the stereoscopic scene.

At block 454, a determination may be made as to whether an image change event was detected. The determination at block 454 may be based on the state value shared with the first thread 410 indicating the image change event. If the determination at block 454 is affirmative, at block 458, a new scene is rendered using the new images. Thus, the scene is reset with the new images replacing the old images. The new images may be obtained from a cache or from a server device, such as the server device 120 shown in FIG. 1. Upon resetting the scene to present the new images, the state value may be updated to indicate an image change event is no longer pending. The second thread 450 may then return to block 452 as described above.

Returning to decision block 454, if no image change is pending, the second thread 450 may move to decision block 456 to determine whether a map state change event is pending. If no map state change is detected, at block 472, the same views of the scene may be rendered and the second thread returns to block 452 as described above. The rending of the scene at block 472 may include alternating views between a left view and a right view to present a stereoscopic scene. The rendering may present the scene by organizing the views as shown in FIG. 2C. Rendering may include requesting the display driver draw the images and other screen elements (e.g., cursor, buttons, text) in the allocated display area. The rendering may also include adjusting the stereoscopic viewer device. One such adjustment is activating one eye of the glasses.

If at decision block 456, a determination is made that there is a map state change pending, the second thread 450 may then determine what type of change or changes to the scene need to be implemented to cause the present the scene according to the identified map state. At block 460, an inventory of tiles currently included in each view is taken. The inventory identifies how many tiles are needed to fill the area allocated for the scene and whether the tiles have image data to present. For example, some of the tiles may already have a texture (e.g., image) for display while other tiles may lack a texture for display. The inventory may include maintaining a list of tiles for each stereoscopic view in the scene. The tiles may be identified using geolocation information or other information that allows the tile to be uniquely identified to a geospatial region shown in the tile.

For each tile, at block 464 may made to determination is made as to whether the tile is associated with a texture. If the tile is not associated with a texture, the second thread 450 moves to block 466 where a determination is made as to whether the texture is available. The determination may be based on a query of a cache of textures. For example, as shown in FIG. 2B, additional images may be obtained prospectively. These images may be stored in a cache that is accessible by the second thread 450. If the texture needed for filling a tile that is not presently associated with an image, the cache may be accessed. The cache may be organized geospatially such that an efficient query of the cache using the area of interest can be achieved. If the determination at block 466 is affirmative, the cached texture is assigned to the tile at block 470. The second thread 450 then returns to block 462 to determine whether additional tiles need to be checked.

If, at block 466, it is determined that a texture for filling the tile is not available, at block 468, a texture may be obtained such as by download from a web mapping service. Obtaining a texture may include submitting a request message from the client device to the server device hosting the web mapping service. The request message may include an indicator for the area of interest for the desired texture. The client device may then receive a response message identifying the texture (e.g., image data) requested. The response message may include the image, metadata, math model, and other image data. In some implementations, the response message may include a pointer to one or more elements of image data such as a URL identifying the location of the image for download. As shown in FIG. 4, the download of a texture may be performed in a download thread. This allows the second thread 450 to continue processing tiles without waiting for a given request and download to complete. This improves the efficiency with which the plugin can render the scene. Once the download thread is initiated, the second thread 450 may return to block 462 to determine whether additional tiles need to be checked.

Returning to block 464, if a determination is made that the current tile is not missing a texture, the second thread 450 returns to block 462 to determine whether additional tiles need to be checked.

At block 462, if all tiles have been checked and are associated (or in the process of being associated) with a texture, at block 472, the tiles of the scene are rendered and the map state change value is adjusted to indicate that a change in map state is no longer pending. The rending of the scene may include alternating views between a left view and a right view to present a stereoscopic scene. The rendering may present the scene by organizing the views as shown in FIG. 2C. Rendering may include requesting the display driver draw the images and other screen elements (e.g., cursor, buttons, text) in the allocated display area. The rendering may also include adjusting the stereoscopic viewer device. One such adjustment is activating one eye of the glasses.

Once the scene is rendered, the second thread 450 returns to block 452 to process additional updates or changes to the scene.

To further illustrate the features of the stereoscopic viewer, consider an embodiment including some commercially available components. To display a scene in stereo that is viewable with NVidia's stereoscopic glasses, an application must interface with the graphics hardware. This presents a challenge for web-based applications, since support for hardware graphics is limited. One way to provide advanced scene rendering in a web-based application is using WebGL. However, WebGL does not support stereoscopic rendering.

To overcome this challenge, the exemplary stereoscopic viewer may be implemented as an ActiveX control. ActiveX is supported natively for Internet Explorer, and is also capable of running within Firefox with the Firefox ActiveX Host plugin.

ActiveX provides features which allow the stereoscopic viewer to provide the sophisticated stereoscopic scene renderings in the constrained web-based environment. For example, implementations using ActiveX allow native C++ code to run within a web-browser, allowing access to the Direct3D API to interface with the graphics hardware. As discussed above, to initialize and present a scene via a Direct3D device, access to the window handle on which the scene will be displayed is required. The ActiveX API provides access to a valid window handle. Once the Direct3D device is properly setup, a scene can be rendered within a browser window using graphics hardware.

One additional piece is required to render a stereo scene using Direct3D, and that is a stereo handle from the stereo viewer hardware (e.g., glasses). Nvidia's API (NvAPI) provides one implementation for accessing the viewer hardware. The stereo handle can be created from the Direct3D device using an NvAPI call. It is used to render a separate scene for both the left and right eyes, and then present them in sync with the shutter glasses. Additional details about NVIDIA's 3D VISION hardware and software components are described in NVIDIA, "NVIDIA 3D Vision Pro and Stereoscopic 3D", WP-05482-001_v01 (October 2010), the entirety of which is incorporated by reference.

Figure 5:
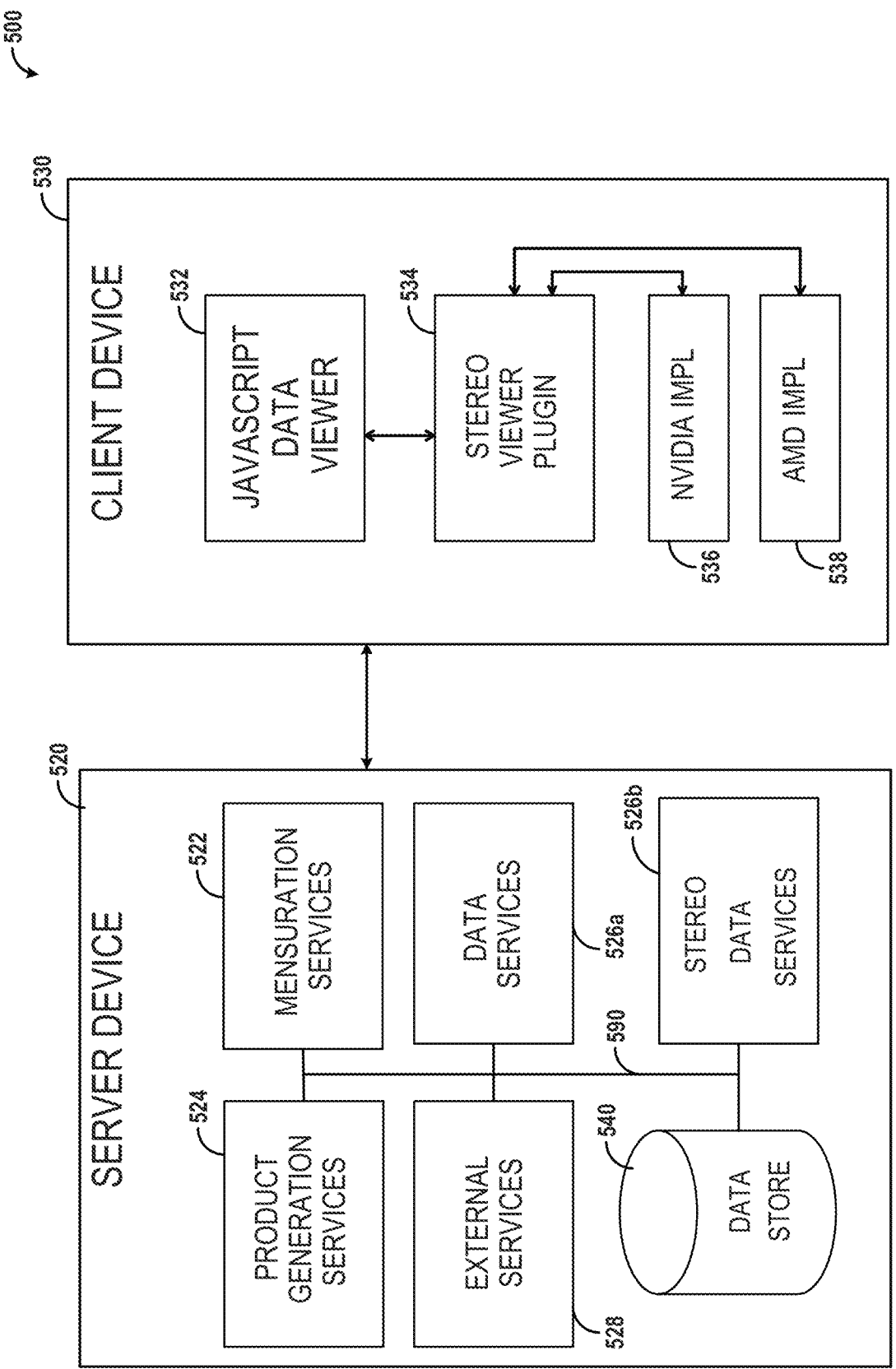
FIG. 5 shows a functional block diagram of another example of a stereoscopic display system including a stereo viewer plugin.

FIG. 5 shows a functional block diagram of another example of a stereoscopic display system including a stereo viewer plugin. Aspects of the system 500 shown in FIG. 5 may be implemented in the system shown in FIG. 1. Similarly, aspects shown in the system 100 of FIG. 1 may be implemented in the system shown in FIG. 5.

The system 500 includes a client device 530 and a server device 520. The client device 530 is similar to the client device 130 described in FIG. 1. The server device 520 is similar to the server device 120 described in FIG. 1.

The client device 530 shows a JavaScript data viewer 532. The JavaScript data viewer 532 is provided to link a client application, such as a web-browser, to a stereo viewer plugin 534. The stereo viewer plugin 534 may be dynamically configured based on the hardware available to the client device 530. As shown in FIG. 5, two stereo viewing hardware implementations are included, an NVIDA implementation 536 and an AMD implementation 538. The stereo viewer plugin 534 may detect the stereo viewing hardware such as by querying a hardware registry for the client device 530 or attempting to load a library of functions specific to an implementation. In some embodiments, a configuration value for the stereo viewer plugin may identify the desired hardware. Once the hardware is detected, the stereo viewer plugin 534 may then load only the implementation needed for the available hardware. This arrangement allows for the stereo viewer plugin 534 to present stereo functionality via a variety of hardware with minimal reconfiguration of the client device 530. As new hardware is supported, the commands for supporting the additional implementations can be acquired by the client device 530 such as via download and/or installation from memory.

The client device 530 may communicate with the server device 520 such as via a network (not shown). The client device 530 may obtain image data from data services 526a hosted by the server device 520. A web-mapping service is one example of a data service. In some implementations, the server device 520 may include specific stereo data services 525b. The stereo data services 526b may provide functionality to interoperate specifically with the stereo viewer plugin 534 such as support functions for rendering scenes, tiling, cache management, plugin update delivery, and the like. Other services that may be hosted by the server device 520 include mensuration services 522, product generation services 524, as well as a gateway to other external services 528.

The mensuration services 522 provide measuring functionality that permit accurate translations of interactions with an image to specific geospatial points. For example, if a user selects a region of an image shown by the stereo viewer plugin 534, the selection may define a specific geospatial region. The mensuration service 522 may consider factors such as the image, sensors used to capture the image, and the selected region to determine the specific geospatial region.

The product generation services 524 may provide an interface for defining new image data. For example, if an image shown by the stereo viewer plugin 534 is annotated such as with text, lines, or other graphic enhancements, the annotated and/or enhanced image may be stored as a new product.

The basis for the geo-positioning capabilities of the system 500 may rely on the correct manipulation of the image coordinate space in the 3D stereo view into the original image space. Once in the original image space, sensor math models, in conjunction with a least squares triangulation process, may be used to convert original image space coordinates from the two images into a precise 3D geographic coordinate. Moreover, the errors associated with picking two image points via the stereo view must be properly propagated throughout the transformations to properly predict the error with the ground space coordinate as shown in "Covariance Propagation for Guided Matching" by Ochoa and Belogie, 2006 which is hereby incorporated by reference in its entirety. By way of example, picking image points with low accuracy may result in large error estimations in the ground space coordinate. When planning activities such as autonomous vehicle flight paths, delivery locations, or rescue operations, such errors can have significant consequences.

The client device 130 may display an area of interest over a pair of epipolar-rectified stereo images, which may be dynamically requested from a web-service. Coordinated operation between shutter glasses (e.g., glasses 182) and stereoscopic rendering such as provided by the stereo viewer plugin 150 may be used to display the imagery pairs simultaneously, so that the left image is seen with the left eye, and the right image is seen with the right eye. Objects in the scene such as buildings and trees appear to "pop out" in front of the viewer, providing the illusion of depth.

Mensuration from stereo imagery can be performed by selecting a point in the left image and its corresponding point in the right image. With both of these points, a sensor model in conjunction with triangulation may be used to obtain a geographic coordinate. However, in the client device 130, particularly a client device providing stereoscopic functionality in a limited web-browser based environment, the user does not necessarily select points in the original image space, but within a stereo space where the original pixel data has been warped by a series of transformations to provide an image suitable for presentation via the client device 130. The transformation sequence to bring points selected in the warped stereo space back to the original image space, as well as an approach for accurately indicating the image pointing error along during these transformations is shown.

In the client device 130, the cursor 240 may provide a mouse cursor coordinate with respect to a point on the display 184 (e.g., an origin). One or more of the graphics hardware, operating system, or browser plugin may be responsible for transforming the mouse cursor coordinate to stereo space, whose origin may be specified as the upper left corner of the stereoscopic presentation area 210 presented via the web-browser 140.

Via the client device 130, a user may adjust the parallax (x-coordinate offset or y-coordinate offset from the left scene to right) of the cursor 240, the image shown in the stereoscopic presentation area 210, or both.

Figure 6:
FIG. 6 shows example left and right scenes with respective cursors.

FIG. 6 shows example left and right scenes with respective cursors. The adjustments produce two cursors 602 and 604 that are associated with stereo coordinates in both a left scene 610 and a right scene 620. The stereo coordinates may be identified in the interface such as using text that is displayed with each scene. In FIG. 6, coordinates for the left cursor 602 are identified as "Cursor L" and coordinates for the right cursor 604 are identified as "Cursor R". Note that the coordinates shown specify the location of the cursors using the coordinates of the scene. That is, the coordinates are not yet translated into specific spatial ground coordinates. The interface may include text identifying the source image for the left scene 610 and the right scene 620 (e.g., "Image L" and "Image R").

Given a cursor point (e.g., cursor stereo coordinate) in the left scene 610 $\tilde{x}_{S_{LEFT}}$ and a cursor point (e.g., cursor stereo coordinate) in the right scene 620 $\tilde{x}_{S_{RIGHT}}$, the final parallax p in stereo space may be defined by a relationship between the respective cursor points. One expression of this relationship is shown in Equation (1).

$$p = \tilde{x}_{S_{RIGHT}} - \tilde{x}_{S_{LEFT}} \qquad \text{Equation 1}$$

The transformations and error propagation described further herein deal with an individual point, which is from either the left eye or the right eye. However, the features described may be applied for either or both views.

In the client device 130, the user may adjust the area of interest rendered in the stereoscopic presentation area 210 by panning or zooming. This adjustment introduces a two dimensional translation vector $t=(t_1, t_2)^T$ and zoom scalar s relative to the rectified image. Let the two dimensional point $\tilde{x}_S$ be position of the cursor in stereo (e.g., as shown in the stereoscopic presentation area 210 via the web-browser 140), then the corresponding point $\tilde{x}_R$ in rectified space is dependent on the translation vector and the zoom scalar. One expression of this relationship is shown in Equation (2).

$$\tilde{x}_R = \frac{(\tilde{x}_S + t)}{s} \qquad \text{Equation 2}$$

Figure 7:
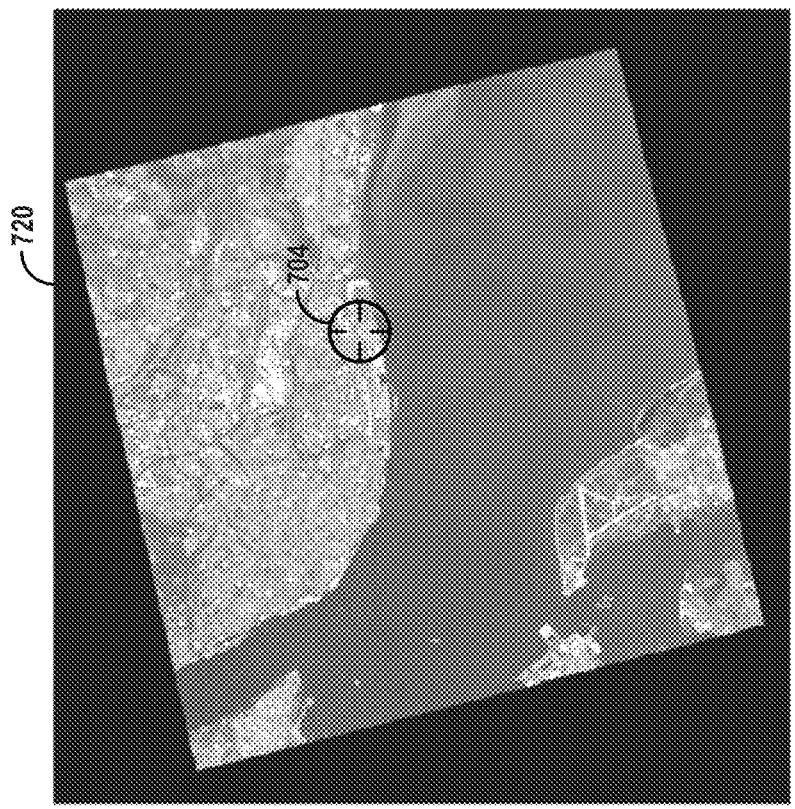
FIG. 7 shows example left and right rectified images with respective cursors.
Figure 7:
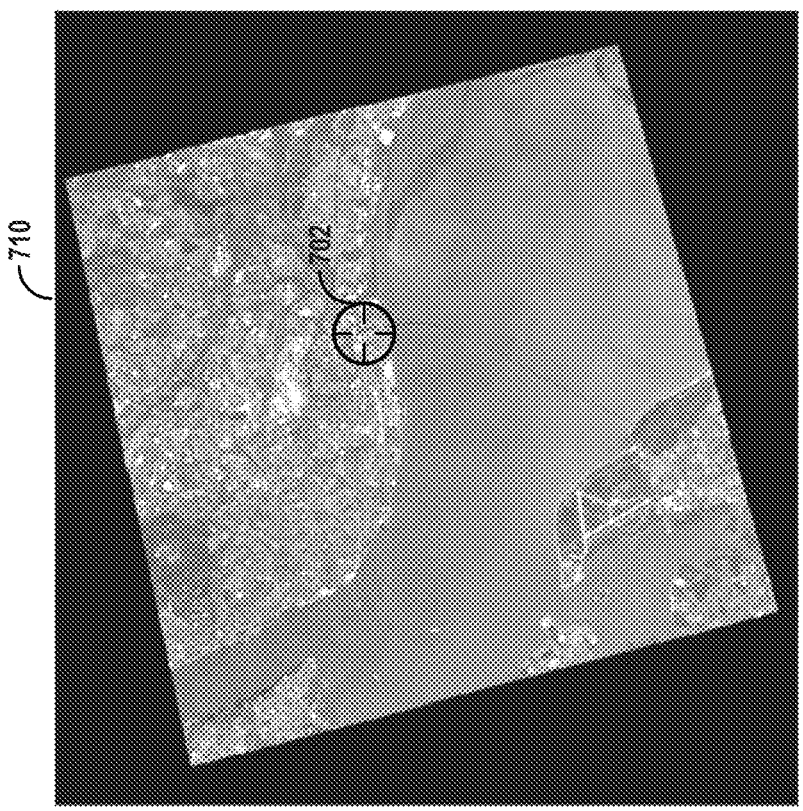

Using homogeneous coordinates, Equation 2 can be written as:

$$x_R = H_{S,R} x_S$$

where $$H_{S,R} = \begin{bmatrix} 1/s & 0 & t_1/s \\ 0 & 1/s & t_2/s \\ 0 & 0 & 1 \end{bmatrix}$$

is the transformation from the stereo space to the rectified space as shown in FIG. 7.

FIG. 7 shows example left and right rectified images with respective cursors. A left rectified image 710 corresponds to the left scene 610 shown in FIG. 6. A right rectified image 720 corresponds to the right scene 620 shown in FIG. 6. A left cursor 702 is shown relative to the left rectified image 710 and a right cursor 704 is shown relative to the right rectified image 720.

If the images are already provided as epi-polar rectified, then the rectified space and original image space are the same or substantially the same within a certain error tolerance. However, if the imagery requires epi-polar rectification (e.g., alignment of an image with a predetermined location such as a geospatial polar coordinate or line), then an additional transformation is required to obtain the original image coordinates compatible for triangulation. As shown in FIG. 7, the images 710 and 720 include negative space (e.g., a black border surrounding the black-and-white graphics) indicating how the graphics are rotated to provide images with a desired orientation. For example, a 3-by-3 transformation matrix $H_{R,O}$ may be used to transform from rectified space to the original image space based at least in part on the original images' sensor model.

The point $x_R$ in the rectified space may transformed to the point $x_O$ in the original space by applying the transformation such as the 3-by-3 transformation matrix $H_{R,O}$. Equation 3 provides one expression of how the transformation may be applied.

$$x_O = H_{R,O} x_R \qquad \text{Equation 3}$$

In some implementations, a transformation from viewport space to the original space may be applied to obtain the original space reference for a point referenced using stereo space information. For example, a transformation $H_{S,O}$ from the viewport space to the original space may be generated using Equation 4.

$$H_{S,O} = H_{R,O} H_{S,R} \qquad \text{Equation 4}$$

Equation 4 or a similar transformation enables a point $x_S$ in the stereo space to be transformed to a point $x_O$ in the original space such as by Equation 5.

$$x_O = H_{S,O} x_S \qquad \text{Equation 5}$$

Figure 8:
FIG. 8 shows example original left and right images with respective cursors.
Figure 8:
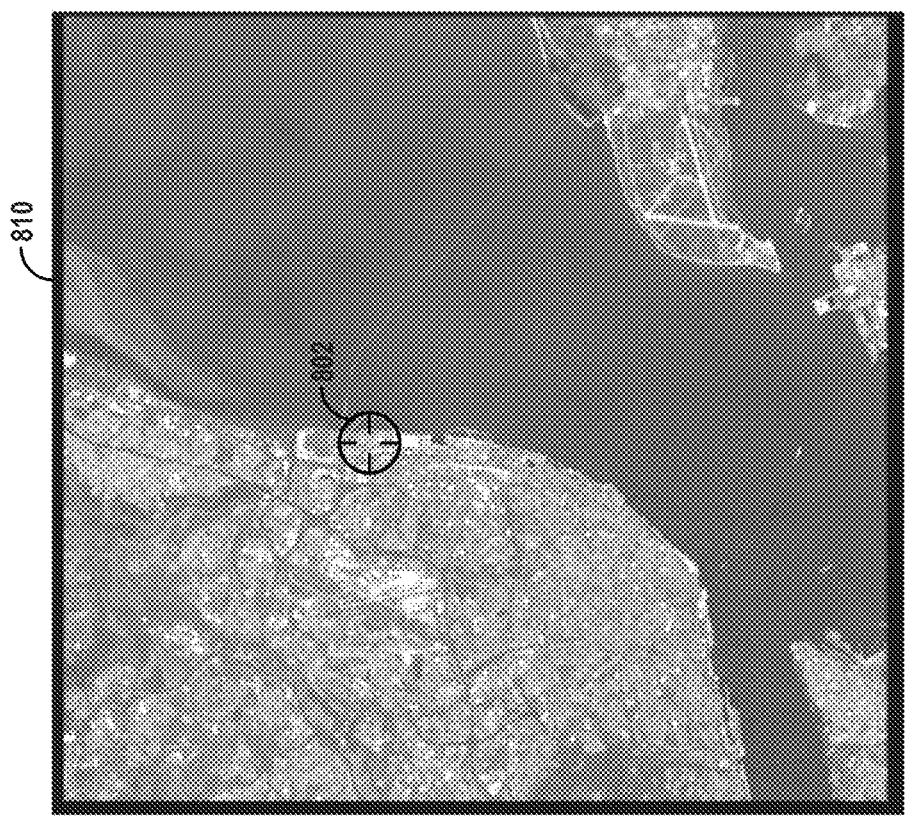

FIG. 8 shows example original left and right images with respective cursors. A left image 810 corresponds to the left rectified image 710 shown in FIG. 7. A right image 820 corresponds to the right rectified image 720 shown in FIG. 7. A left cursor 802 is shown relative to the left image 810 and a right cursor 804 is shown relative to the right image 820.

As shown in FIG. 8, the final left and right points may be converted to inhomogeneous coordinates within respective original images (e.g., image 810 and image 820). The inhomogeneous coordinates may identify respective points within the original images that can be provided as input to the triangulation process to generate a 2D (e.g., x-y pair) or 3D (e.g., x-y-z tuple) ground coordinate.

In the client device 130, it is assumed there is uncertainty involved in point selection in stereo space. For a selected point $x_S$ in stereo space, this uncertainty may be modeled by an associated covariance matrix $\Sigma_{x_S}$. The covariance matrix must be propagated from the stereo space to the original space as its associated point $x_S$ in the stereo space is transformed to a point $x_O$ in the original space as described above. Further, any uncertainty in the transformation matrices $H_{S,R}$ and $H_{R,O}$, modeled as covariance matrices $\Sigma_{d_{S,R}}$ and $\Sigma_{h_{R,O}}$, respectively, must also be propagated to the covariance matrix $\Sigma_{x_O}$ associated with the resulting point $x_O$ in the original space. The resulting points in the original space and their associated covariance matrices are input to the triangulation workflow to determine the ground point (see "Covariance Propagation for Guided Matching" by Ochoa and Belogie, 2006 which is hereby incorporated by reference in its entirety).

Let $x \in \mathbb{R}^n$ be a random vector with mean $\mu_x$ and covariance matrix $\Sigma_x$, and let $f: \mathbb{R}^n \to \mathbb{R}^m$ be a nonlinear function. Up to first-order approximation, $y = f(x) \approx f(\mu_x) + J(x - \mu_x)$, where $J \in \mathbb{R}^{m \times n}$ is the Jacobian matrix a $\partial f / \partial x$ evaluated at $\mu_x$. If f is approximately affine in the region about the mean of the distribution, then this approximation is reasonable and the random vector $y \in \mathbb{R}^m$ has mean $\mu_y \approx f(\mu_x)$ and covariance $\Sigma_y \approx J \Sigma_x J^T$.

If x is composed of two random vectors a and b such that $x = (a^T b^T)^T$, then $$\sum_y \approx [J_a \ J_b] \begin{bmatrix} \sum_a & \sum_{ab} \\ \sum_{ba} & \sum_b \end{bmatrix} \begin{bmatrix} J_a^T \\ J_b^T \end{bmatrix}$$

where $J_a = \partial y / \partial a$ and $J_b = \partial y / \partial b$.

Consider a homogeneous two dimensional point x represented by the vector $(x, y, w)^T$. The vector $s(x, y, w)^T$, where s is any nonzero scalar, represents the same two dimensional point as $(x, y, w)^T$. It follows that $(x, y, w)^T \sim s(x, y, w)^T$, where ~denotes equality up to a nonzero scale factor.

Due to the use of homogeneous representations, several projective mappings are only determined up to scale (see "Algebraic Projective Geometry" by Semple and Kneebone, 1952 which is hereby incorporated by reference in its entirety). Relevant examples include two dimensional point mapping $x_2 \sim H_{1,2} x_1$, where $H_{1,2}$ represents the transformation from a point $x_1$ in image 1 to a point $x_2$ in image 2; and projective transformation accumulation $H_{1,3} \sim H_{2,3} H_{1,2}$, where $H_{2,3}$ represents the transformation from a point $x_2$ in image 2 to a point $x_3$ in image 3 and $H_{1,3}$ represents the transformation from a point $x_1$ in image 1 to a point $x_3$ in image 3. Both of these mappings can be generalized as $C \sim AB$, where $C \in \mathbb{R}^{m \times n}$, $A \in \mathbb{R}^{m \times p}$, and $B \in \mathbb{R}^{p \times n}$. However, because C is only determined up to scale, the entries of C may vary without bound. This poses an issue for covariance propagation and uncertainty analysis. It is usual to impose the constraint that $\|C\| = 1$, where $\|\cdot\|$ denotes the Frobenius norm. Under this constraint, the generalized mapping is $C = (AB)/\|AB\|$ and the variance of the entries of C are constrained accordingly.

For the expression:

$$C = \frac{AB}{\|AB\|}$$

where $C \in \mathbb{R}^{m \times n}$, $A \in \mathbb{R}^{m \times p}$, and $B \in \mathbb{R}^{p \times n}$, the matrices $\partial c / \partial a$ and $\partial c / \partial b$ may be computed analytically as:

$$J_a = \frac{\partial c}{\partial a} = \frac{1}{\|AB\|} \left[ (I_{m \times m} \otimes B^T) - cvec(BC^T)^T \right]$$

$$J_b = \frac{\partial c}{\partial b} = \frac{1}{\|AB\|} \left[ (A \otimes I_{n \times n}) - cvec(C^T A)^T \right]$$

where $\otimes$ denotes the Kronecker product.

These are the Jacobian matrices used to approximate the covariance $$\sum_c \approx [J_a \ J_b] \begin{bmatrix} \sum_a & \sum_{ab} \\ \sum_{ba} & \sum_b \end{bmatrix} \begin{bmatrix} J_a^T \\ J_b^T \end{bmatrix}$$

Given a sequence of two dimensional transformations and their associated covariance matrices, where each transformation maps points between successive images, the transformations may be composed as:

$$H_{1,n} = H_{n-1,n} H_{n-2,n-1} \ldots H_{2,3} H_{1,2}$$

where $H_{1,n}$ represents the transformation from a point $x_1$ in image 1 to a point $x_n$ in image n.

Equivalently, the transformation $H_{1,n}$ may be calculated by accumulating the two dimensional transformations. This accumulation may be performed on the client device using the information received from various sources of the image data used to generate the stereoscopic scene. One example transformation is shown in Equation (6).

$$H_{1,i} = \frac{H_{i-1,i} H_{1,i-1}}{\|H_{i-1,i} H_{1,i-1}\|} = \frac{AB}{\|AB\|} \text{ for } i = 3, \ldots, n \qquad \text{Equation 6}$$

The covariance of $H_{1,i}$ can be approximated such as by Equation 7.

$$[J_a \quad J_b] \begin{bmatrix} \sum_a & \sum_{ab} \\ \sum_{ba} & \sum_b \end{bmatrix} \begin{bmatrix} J_a^T \\ J_b^T \end{bmatrix} \quad \text{Equation 7}$$

Note that as the projective transformations are accumulated, so are their covariances.

Given a point $x_1$ in image 1 and the projective transformation matrix $H_{1,n}$ that maps points in image 1 to points in image n, $x_1$ maps to the point $x_n$ in image n by, for example:

$$x_n = \frac{H_{1,n} x_1}{\|H_{1,n} x_1\|} = \frac{Ab}{\|Ab\|}$$

The covariance of $x_n$ may be approximated such as by:

$$[J_a \quad J_b]$$

In certain embodiments, the errors in image pointing may be incorporated into the error estimation for the ground point. The ground point error may be presented as a final product such that, if the error for the final coordinate generated increases to a specified point (e.g., error threshold), an error dialog box may be presented to the user such as via the web-browser 140. The ground point error may be specified dynamically as the cursor 240 is moved. For example, the ground coordinate errors may cause the presentation of the cursor 240 to change. For example, the cursor 240 may be displayed in a first color (e.g., green) when error is 5 meters or less, a second color (e.g., yellow) for error of 5-10 meters, and a third color (e.g., red) for error of 10 meters or greater. Additional or alternate display characteristics of the cursor 240 may be adjusted based on the error such as shape or color intensity. In some implementations, the error may be specified using other perceivable indications such as sound (e.g., playback of audio), text (e.g., include text display of error on a portion of the web-browser 140 or within the stereoscopic presentation area 210).

Returning to FIG. 5, the client device 130 may provide accurate ground coordinates to one or more external services 528 include target materials processing services, collateral damage estimation services, target nomination services, target data storage, flight path planning services, route planning services, or object-based production processing services. The coordinates may be provided along with error estimations such as described above.

A data store 540 may be included in the server device 520 to store coordinates, transformation, or other information to support one or more of the services described. The data store 540 may also be specifically configured to store geospatial data and, in some instances, geospatial image data. For example, the configuration may include indexing based on geospatial location information associated with records stored in the data store 540. A bus 590 may be included in the server device 520 to allow the elements included in the server device 520 to exchange data (e.g., messages).

Another embodiment of an apparatus for rendering a stereoscopic scene may include means for receiving a display area allocation from a client application. The means for receiving the display area allocation may include hardware configured to receive a message indicating the display area allocation. The apparatus also includes means for synchronizing display of the stereoscopic scene between a display device and a stereoscopic viewing device. The synchronization may include a timer or counter to provide a benchmark state for rendering the stereoscopic scene. The benchmark state can be accessed by the devices that are being synchronized and, based on the benchmark state, adjust their respective configurations. The apparatus may include means for alternating display of a left view of the stereoscopic scene and a right view of the stereoscopic scene in the display area via the client application on the display device. The means for alternating display may use the benchmark state to cause the adjustments to the display device. The apparatus may also include means for alternating activation of a left eye and a right eye of the stereoscopic viewing device, wherein the left eye is activated when the left view of the stereoscopic scene is displayed on the display device, and wherein the right eye is activated when the right view of the stereoscopic scene is displayed on the display device. The benchmark state may also be access by the means for alternating activation to cause adjustments to the stereoscopic viewing device.

Figure 9:
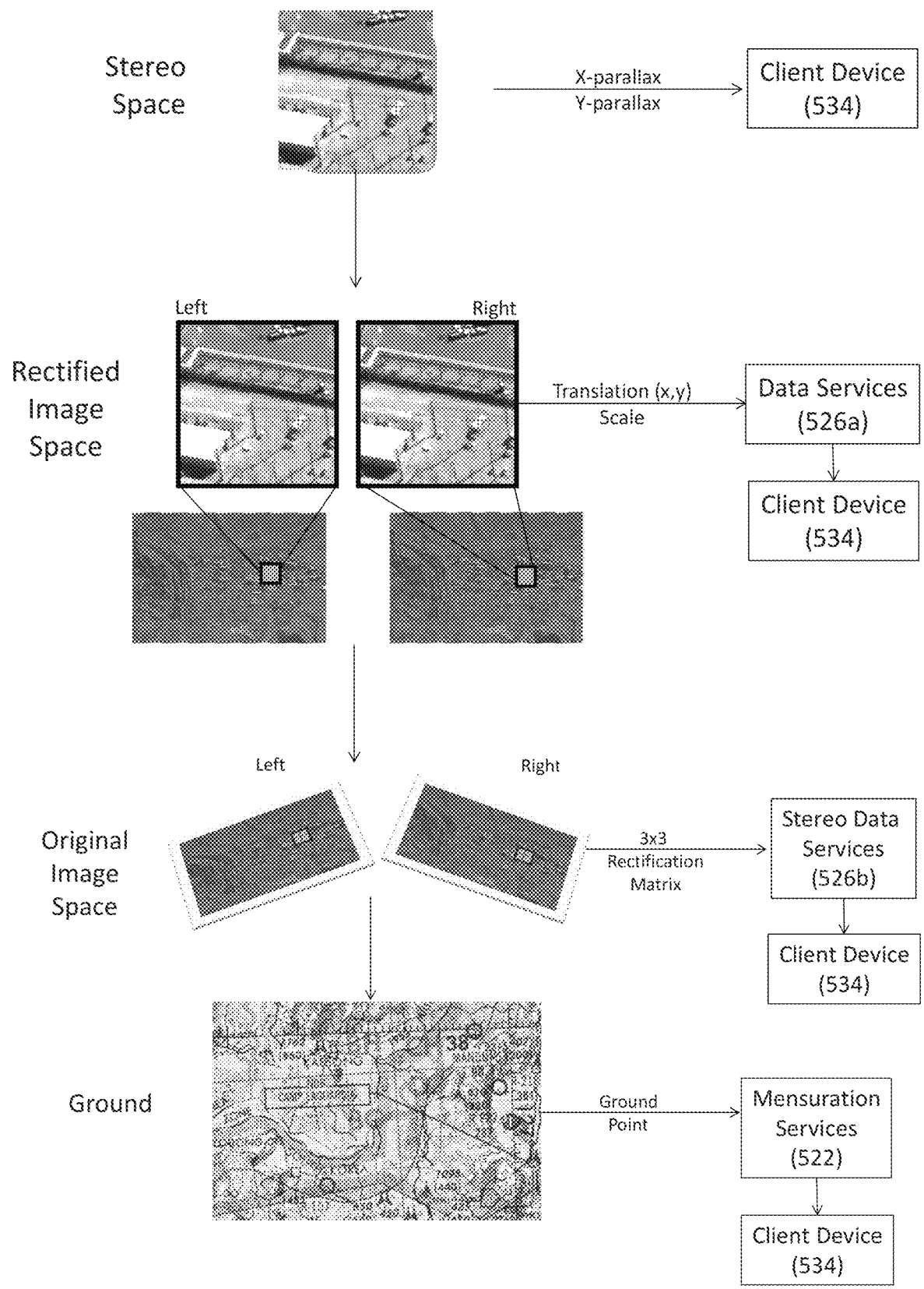
FIG. 9 illustrates the various images and inputs to the client device for generating accurate ground coordinates from a stereoscopic image.

FIG. 9 illustrates the various images and inputs to the client device for generating accurate ground coordinates from a stereoscopic image. FIG. 9 includes stereoscopic space images. These images may be presented in the viewport of a client device such as the client device 534 using various x-parallax and y-parallax values. The x-parallax and y-parallax values may be stored in client device 534. To generate the stereoscopic space image, left and right rectified images may be used. The left and right images may be taken from different rectified images. As shown in FIG. 9, the left and right rectified images represent a portion of respective rectified images. The data service 526a track what portions shown via x and y translations and at what scale. These translation values and scaling values may be provided and stored at the client device 534 for use in calculating the ground coordinate.

Non-rectified versions of the rectified images are also shown in FIG. 9. The non-rectified versions may be referred to as "original" images because they represent the image data as received from the sensor. The original images may be rectified such as by using epi-polar rectification as described. The rectification applied (e.g. through a 3×3 rectification matrix) may be identified by the stereo data service 526b and provided and stored to the client device 534 for calculating the ground coordinate.

Once the client device 534 detects an interaction with a location such as via a cursor selection, the ground point may be calculated and provided to a mensuration service(s) 522. For example, multiple points may be selected. The client device 534 may calculate respective ground points for the selected points and provide the ground points to the mensuration service(s) 522. The calculation may include identifying a coordinate within the viewer correspond to the cursor selection (e.g., viewport coordinate). The viewport coordinate may be specified as a pair of coordinates, one for the left image and one for the right image used to present the stereoscopic scene. Once a viewport coordinate for an image is identified, a corresponding location within a rectified image is identified. This location may be specified as a rectified coordinate. Because the rectified image may be adjusted from an original image, the rectified coordinate may again be translated into an original coordinate corresponding to a location within the original image. At this point, the coordinates may reference locations within an image but not yet identify a true spatial coordinate. From the original coordinate, the spatial coordinate of a ground location corresponding to the cursor selection may be generated. The spatial coordinate may be generated based in part on a sensor model indicating properties of how the original image was captured (e.g., camera, distance, speed, etc.). This information may be provided to the viewer as part of the image data. In this way, the information needed to generate the spatial coordinate can be delivered "on demand" to the viewer and applied as selections are made and without resource intensive (e.g., memory, bandwidth, processing) communications. As discussed herein, each transformation applied to the cursor selection to generate the ground coordinate may be associated with an error. The features described, allow the viewer to accumulate these errors and generate the ground coordinate efficiently. The mensuration service(s) 522 may transmit a response message to the client device 534 indicating the acceptance of the ground point(s), additional error, or other measurement response for the selected point(s).

Although FIG. 9 shows the various sources of the information used by the client device 534 for calculating the ground point coordinate, the information from these sources may be provided to the client device 534 along with the image data that will be displayed in the stereoscopic scene. Accordingly, the client device 534 need not communicate with each individual source for the transformation information associated therewith. Instead, as part of receiving the image(s) for presentation, the client device 534 may receive the information needed to accurately generate a ground point coordinate for a selected point within the stereoscopic view.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art may appreciate that the scope of the disclosure is intended to cover any aspect of the novel systems, apparatuses, and methods disclosed herein, whether implemented independently of, or combined with, any other aspect described. For example, an apparatus may be implemented or a method may be practiced using any number of the aspects set forth herein. In addition, the scope of the described features is intended to cover such an apparatus or method which is practiced using other structure, functionality, or structure and functionality in addition to or other than the various aspects of the invention set forth herein. It may be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not limited to particular benefits, uses, or objectives. Rather, aspects of the disclosure are broadly applicable to different stereoscopic graphics technologies, system configurations, networks, and transmission protocols, some of which are illustrated by way of example in the figures and the included description of the preferred aspects. The detailed description and drawings are merely illustrative of the disclosure rather than limiting, the scope of the disclosure being defined by the appended claims and equivalents thereof.

The terms "processor" and "processor module," as used herein are broad terms, and are to be given their ordinary and customary meaning to a person of ordinary skill in the art (and are not to be limited to a special or customized meaning), and refer without limitation to a specifically configured computer system, state machine, processor, or the like designed to perform specific arithmetic or logic operations using logic circuitry that responds to and processes the basic instructions that drive a computer to perform the specific stereoscopic imaging methods described. In some embodiments, the terms can include ROM and/or RAM associated therewith.

As used herein, the term "determining" encompasses a wide variety of actions. For example, "determining" may include calculating, computing, processing, deriving, investigating, looking up (for example, looking up in a table, a database or another data structure), ascertaining and the like. Also, "determining" may include receiving (for example, receiving information), accessing (for example, accessing data in a memory) and the like. Also, "determining" may include resolving, selecting, choosing, establishing, and the like.

As used herein, the term "message" encompasses a wide variety of formats for representing information for transmission. A message may include a machine readable aggregation of information such as an XML document, fixed field message, comma separated message, or the like. While recited in the singular, it will be understood that a message may be composed/transmitted/stored/received/etc. in multiple parts.

As used herein a "graphical user interface" or "interface" may include a web-based interface including data fields or other control elements for receiving input signals or providing electronic information. The graphical user interface or interface may be implemented in whole or in part using technologies such as HTML, Flash, Java, .net, web services, and RSS.

As used herein, a plugin may include a set of software components that add specific capabilities to a larger software application. A plugin enable enhancing the functionality of an application by receiving inputs and providing outputs via the plugin but within the context of the larger software application. An "add-on" is a general term comprising snapins, plugins, extensions, themes, and custom controls. It should be understood that any of these terms may be used interchangeably herein.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output signal indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electromechanical state change to a device. Activation of a device may cause the device, or a feature associated therewith, to change from a first state to a second state. In some implementations, activation may include changing a characteristic from a first state to a second state such as, for example, changing the viewing state of a lens of stereoscopic viewing glasses. Activating may include generating a control message indicating the desired state change and providing the control message to the device to cause the device to change state.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

Conditional language used herein, such as, among others, "can," "could," "might," "may," "e.g.," "for example," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out altogether (for example, not all described acts or events are necessary for the practice of the method). Moreover, in certain embodiments, acts or events can be performed concurrently, for example, through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware. Aspects of the features may be implemented using computer software that includes specific instructions to configure a computing device to perform the particular features described. Various illustrative components, blocks, modules, circuits, and steps may be described above generally in terms of their functionality. Whether such functionality is implemented as hardware or software depends upon the particular application and design constraints imposed on the overall system. The described functionality can be implemented in varying ways for each particular application, but such embodiment decisions should not be interpreted as causing a departure from the scope of the disclosure.

The various illustrative logical blocks, modules, and circuits described in connection with the embodiments disclosed herein can be implemented or performed with a special purpose stereoscopic graphics processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A special purpose stereoscopic graphics processor can include a microprocessor, but in the alternative, the processor can be any conventional processor, controller, microcontroller, or state machine specifically configured to implement all or portions of the algorithms described or generate all or portions of the interfaces and messages described. A processor can also be implemented as a combination of computing devices, for example, a combination of a DSP and a microprocessor, a plurality of microprocessors, one or more microprocessors in conjunction with a DSP core, or other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosures described herein can be embodied within a form that does not provide all of the features and benefits set forth herein, as some features can be used or practiced separately from others. The scope of certain disclosures disclosed herein is indicated by the appended claims rather than by the foregoing description. All changes which come within the meaning and range of equivalency of the claims are to be embraced within their scope.

The invention claimed is:

1. A method of using a client application plugin for rendering a stereoscopic scene in a web-browser on a client device in communication with a server device, the method comprising:
provisioning a client application interface on a display of the client device;
initializing the client application plugin for rendering a stereoscopic scene;
identifying a display area in the web-browser for presenting a stereoscopic scene;
identifying an interaction within the display area, the interaction associated with:
(i) a first coordinate within the display area with a first view of the stereoscopic scene, and (ii) a second coordinate within the display area with a second view of the stereoscopic scene; and
generating a set of coordinates for a location identified by the interaction based at least in part on a user specified parallax, the set of coordinates including:
a viewport coordinate identifying the location using coordinates within the first view and the second view;
a rectified coordinate identifying the location within rectified versions of a first image and a second image using the viewport coordinate, wherein the first image forms at least a part of the first view, and wherein the second image forms at least a part of the second view;
an original image coordinate identifying the location within the at least one image and the at least one other image using the rectified coordinate; and
a spatial coordinate identifying the location as a geospatial location using the original image coordinate.

2. The method of claim 1, further comprising:
generating, using the client application interface, a first viewport coordinate for the first view based at least in part on the first coordinate and the user specified parallax; and
generating, using the client application interface, a second viewport coordinate for the second view based at least in part on the second coordinate and the user specified parallax,
wherein the viewport coordinate included in the set of coordinates comprises one of the first viewport coordinate or the second viewport coordinate.

3. The method of claim 1, further comprising:
generating, using the client application interface, a first rectified image coordinate based at least in part on a first viewport coordinate included in the set of coordinates, and at least one of: (i) a first scaling factor or (ii) a first translation applied to the at least one image shown in the first view; and
generating, using the client application interface, a second rectified image coordinate based at least in part on a second viewport coordinate included in the set of coordinates, and at least one of: (i) a second scaling factor or (ii) a second translation applied to the at least one other image shown in the second view,
wherein the rectified coordinate included in the set of coordinates comprises one of the first rectified image coordinate or the second rectified image coordinate.

4. The method of claim 1, further comprising:
generating, using the client application interface, a first original image coordinate based at least in part on a first rectified image coordinate included in the set of coordinates and a first rectification applied to the at least one image shown in the first view; and
generating, using the client application, a second original image coordinate based at least in part on a second rectified image coordinate included in the set of coordinates and a second rectification applied to the at least one other image shown in the second view,
wherein the original image coordinate included in the set of coordinates comprises one of the first original image coordinate or the second original image coordinate.

5. The method of claim 1, wherein the generating the set of coordinates comprises generating the spatial coordinate based at least in part on triangulation of a first original image coordinate and a second original image coordinate.

6. The method of claim 1, wherein the spatial coordinate identifies a three dimensional location.

7. The method of claim 1, further comprising:
generating, using the client application interface, an image point error estimate for the viewport coordinate by accumulating the errors from x-parallax, y-parallax in stereo space, from translation (x, y) and scale in rectified image space, and from a rectification process in original image space; and
generating, using the client application interface, the spatial coordinate using the image point error estimate generated by the client application interface.

8. The method of claim 7, wherein the client application interface is configured to cause presentation of a perceivable indicator of the error estimate in conjunction with the stereoscopic scene.

9. The method claim 8, wherein the perceivable indicator comprises a color of a cursor displayed within the display area.

10. The method of claim 1, further comprising:
determining, using the client application interface, the interaction within the display area indicates a request to transmit a geospatial identifier for the location indicated by the interaction; and
causing transmission, via a network, of the spatial coordinates generated by the client application interface for the location indicated by the interaction.

11. A method of rendering a stereoscopic scene on a computer system having a client application plugin, the method comprising:
using one or more processing devices configured to execute computer-executable instructions on one or more non-transitory computer storage mediums and the client application plugin linked to a web-browser controlling the computer system to:
generate a stereoscopic scene including a left-eye view and a right-eye view for a specified location;
identify a display area within the web-browser for presenting alternating views included in the stereoscopic scene based at least in part on a user specified parallax;
generate a left viewport coordinate identifying a location of a cursor in the display area using coordinates of the cursor in the left-eye view and the user specified parallax;
generate a right viewport coordinate identifying the location of the cursor using coordinates of the cursor in the right-eye view and the user specified parallax;

generate a left-view rectified coordinate identifying the location of the cursor within at least a portion of a first rectified image shown in the left-eye view using the left viewport coordinate;

generate a right-view rectified coordinate identifying the location of the cursor within at least a portion of a second rectified image shown in the right-eye view using the right viewport coordinate;

generate an original left image coordinate identifying the location of the cursor within the at least one image using the left-view rectified coordinate, the at least one image being a non-rectified version of the first rectified image;

generating an original right image coordinate identifying the location of the cursor within the at least one other image using the right-view rectified coordinate, the at least one other image being a non-rectified version of the second rectified image; and generate a spatial coordinate identifying a geospatial location identified by the location of the cursor using the original left image coordinate and the original right image coordinate.

12. The method of claim 11, wherein the left-view rectified coordinate is generated using the left viewport coordinate and at least one of: (i) a first scaling factor or (ii) a first translation applied to the first rectified image.

13. The method of claim 11, wherein the left view coordinate is generated using the left-view rectified coordinate and a first rectification applied to the non-rectified version of the first rectified image.

14. The method of claim 11, wherein the spatial coordinate is generated based at least in part on triangulation of the original left image coordinate and the original right image coordinate.

15. The method of claim 14, further comprising generating an image point error estimate for the viewport coordinate by accumulating the errors from x-parallax, y-parallax in stereo space, from translation (x, y) and scale in rectified image space, and from a rectification process in original image space, and generate the spatial coordinate using the image point error estimate using the one or more processing devices executing computer-executable instructions.

16. The method of claim 15, further comprising controlling the computer system to cause presentation of a perceivable indicator of the error estimate in conjunction with the stereoscopic scene using the one or more processing devices executing computer-executable instructions.

17. The method of claim 16, wherein the perceivable indicator comprises a color of a cursor displayed within the display area.

18. The method of claim 11, wherein the spatial coordinate identifies a three dimensional location.

19. The method of claim 11, further comprising determining that an interaction within the display area indicates a request to transmit a geospatial identifier for the location indicated by the cursor, and cause transmission, via a network, of the spatial coordinates generated for the location indicated by the interaction using the one or more processing devices executing computer-executable instructions.

20. The method of claim 11, the method further comprising synchronizing alternating presentation of the left-eye view and the right-eye view with alternative activation of the left eye and the right eye of a stereoscopic viewing device based at least in part on a user specified parallax using the one or more processing devices executing computer-executable instructions.

* * * * *

UNITED STATES PATENT AND TRADEMARK OFFICE
CERTIFICATE OF CORRECTION

PATENT NO. : 11,095,874 B1  
APPLICATION NO. : 16/712869  
DATED : August 17, 2021  
INVENTOR(S) : Hitchcock et al.

Page 1 of 1

It is certified that error appears in the above-identified patent and that said Letters Patent is hereby corrected as shown below:

In the Drawings

In sheet 5 of 11, FIG. 3, reference numeral 308, Line 1, delete "STEROSCOPIC" and insert --STEREOSCOPIC--.

In the Specification

In Column 9, Line 38, delete "PROGRAM™" and insert --PROGRAM™,--.

In Column 10, Line 23 (approx.), delete "CLSID:'" and insert --CLSID: '--.

In Column 12, Line 30, delete "2901," and insert --2901,--.

In Column 20, Line 11, delete "NVIDA" and insert --NVIDIA--.

In Column 23, Line 33, delete "$\Sigma d_{S,R}$" and insert --$\Sigma h_{S,R}$--.

In Column 23, Line 45, delete "matrix a" and insert --matrix--.

In Column 23, Line 51, delete "$(a^T b^T)^T,$" and insert --$(a^T, b^T)^T,$--.

In Column 24, Line 6, delete "$H_{1,3} \sim H_{2,3}\ H_{1,2}$ ," and insert -- $H_{1,3} \sim H_{2,3} H_{1,2}$ ,--.

In the Claims

In Column 32, Line 36, Claim 9, delete "method" and insert --method of--.

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*